US012527870B2

(12) United States Patent
Schneider et al.

(10) Patent No.: US 12,527,870 B2
(45) Date of Patent: Jan. 20, 2026

(54) PEPTIDE HYDROGELS FOR DELIVERY OF IMMUNOSUPPRESSIVE DRUGS AND USES THEREOF

(71) Applicants: THE JOHNS HOPKINS UNIVERSITY, Baltimore, MD (US); THE UNITED STATES OF AMERICA, AS REPRESENTED BY THE SECRETARY, DEPARTMENT OF HEALTH AND HUMAN SERVICES, Bethesda, MD (US)

(72) Inventors: Joel P. Schneider, Frederick, MD (US); Poulami Majumder, Frederick, MD (US); Giorgio Raimondi, Severna Park, MD (US)

(73) Assignees: THE JOHNS HOPKINS UNIVERSITY, Baltimore, MD (US); THE UNITED STATES OF AMERICA, AS REPRESENTED BY THE SECRETARY, DEPARTMENT OF HEALTH AND HUMAN SERVICES, Bethesda, MD (US)

( * ) Notice: Subject to any disclaimer, the term of this patent is extended or adjusted under 35 U.S.C. 154(b) by 1323 days.

(21) Appl. No.: 17/051,574

(22) PCT Filed: May 3, 2019

(86) PCT No.: PCT/US2019/030656
§ 371 (c)(1),
(2) Date: Oct. 29, 2020

(87) PCT Pub. No.: WO2019/213562
PCT Pub. Date: Nov. 7, 2019

(65) Prior Publication Data
US 2022/0016250 A1 Jan. 20, 2022

Related U.S. Application Data

(60) Provisional application No. 62/666,471, filed on May 3, 2018.

(51) Int. Cl.
| | |
|---|---|
| *A61K 47/42* | (2017.01) |
| *A61K 31/519* | (2006.01) |
| *A61K 47/20* | (2006.01) |
| *A61K 47/69* | (2017.01) |
| *A61P 37/06* | (2006.01) |
| *C07K 14/00* | (2006.01) |
| *C07K 14/705* | (2006.01) |

(52) U.S. Cl.
CPC ............ *A61K 47/42* (2013.01); *A61K 31/519* (2013.01); *A61K 47/20* (2013.01); *A61K 47/6903* (2017.08); *A61P 37/06* (2018.01); *C07K 14/001* (2013.01); *C07K 14/70503* (2013.01)

(58) Field of Classification Search
CPC .. A61K 47/20; A61K 47/6903; A61K 9/0024; A61P 37/06; C07K 14/001; C07K 14/70503
See application file for complete search history.

(56) References Cited

U.S. PATENT DOCUMENTS

| | | |
|---|---|---|
| 9,260,438 B2 | 2/2016 | Bodhuri et al. |
| 9,670,160 B2 | 6/2017 | Bhirud et al. |
| 2018/0085452 A1* | 3/2018 | Bredehorst .......... A61K 31/685 |

FOREIGN PATENT DOCUMENTS

| | | | |
|---|---|---|---|
| WO | WO-0142246 A2 | 6/2001 | |
| WO | WO-03048162 A1 | 6/2003 | |
| WO | 2010017369 A2 | 11/2010 | |
| WO | WO-2012135338 A1 | 10/2012 | |
| WO | WO-2012137111 A1 | 10/2012 | |
| WO | WO-2013090490 A1 | 6/2013 | |
| WO | WO-2017125417 A1 * | 7/2017 | ........... A61K 31/435 |

OTHER PUBLICATIONS

Xuewen Du, Supramolecular Hydrogelators and Hydrogels: From Soft Matter to Molecular Biomaterials, Chem. Rev. 2015, 115, 13165-13307.*
Michael Bradshaw, Designer self-assembling hydrogel scaffolds can impact skin cell proliferation and migration, Nature, scientific Reports, 2014, pp. 1-6.*
Ema, European Medicines Agency, vismodegib, pp. 1-99. published 2014.*
Sigma Aldrich, Vincristine sulfate, published online 2013.*
EMA* (Committee for Medicinal Products for Human Use (CHMP), 2013, Xeljanz, Assessment report).*
APExBIO, Tofacitinib (CP-690550) Citrate, (published online 2015).*
Pfizer, Australian product information sheet, Xeljanzò tofacitinib (as citrate), 2019, pp. 1-47.*
Loo, et al., "From short peptides to nanofibers to macromolecular assemblies in biomedicine" Biotechnology Advances 30 (2012) 593-603.
Yamada, et al., "Macromolecule—network electrostatics controlling delivery of the biotherapeutic cell modulator TIMP-2" Biomacromolecules (2018) 19:1285-1293.
Sun, et al., "Sustained release of active chemotherapeutics from injectable-solid B-hairpin peptide hydrogel" Biomater. Sci., (2016) 4: 839.
Baca M., et al., "Chemical Ligation of Cysteine-containing Peptides: Synthesis of a 22 kDa Tethered Dimer of HIV-1 Protease", Journal of the American Chemical Society, 1995, vol. 117, No. 7, pp. 1881-1887.

(Continued)

*Primary Examiner* — Lianko G Garyu
*Assistant Examiner* — Erinne R Dabkowski
(74) *Attorney, Agent, or Firm* — Casimir Jones, S.C.; Kelly A. Barton

(57) ABSTRACT

Compositions that include a cationic peptide hydrogel and an immunosuppressive small molecule drug are described. The small molecule drug is crystallized and dispersed in the peptide hydrogel to allow for slow release of the drug. Methods of inhibiting allograft rejection and treating autoimmune-mediated organ damage by local administration of the peptide hydrogel compositions are described.

15 Claims, 7 Drawing Sheets

Specification includes a Sequence Listing.

(56) References Cited

OTHER PUBLICATIONS

Farah S., et al., "Long-term Implant Fibrosis Prevention in Rodents and Non-human Primates Using Crystallized Drug Formulations", Nature Materials, Aug. 2019, vol. 18, pp. 892-904.
Hule R.A., et al., "Correlations Between Structure, Material Properties, and Bioproperties in Self-assembled ß-hairpin Peptide Hydrogels", Faraday Discuss, 2008, vol. 139, pp. 251-420 (20 Pages).
Liu C-F., et al., "Acyl Disulfide-mediated Intramolecular Acylation for Orthogonal Coupling Between Unprotected Peptide Segments: Mechanism and Application", Tetrahedron Letters, 1996, vol. 37, No. 7, pp. 933-936.
Liu C-F., et al., "Chemical Ligation Approach to Form a Peptide Bond Between Unprotected Peptide Segments: Concept and Model Study", Journal of the American Chemical Society, May 18, 1994, vol. 116, No. 10, pp. 4149-4153.
Liu C-F., et al., "Peptide Segment Ligation Strategy Without Use of Protecting Groups", Proceedings of the National Academy of Sciences of the United States of America, Jul. 1994, vol. 91, pp. 6584-6588.

Nakagawa S.H., et al., "The Use of Polymer-bound Oximes for the Synthesis of Large Peptides Usable in Segment Condensation: Synthesis of a 44 Amino Acid Amphiphilic Peptide Model of Apolipoprotein A-1", Journal of the American Chemical Society, 1985, vol. 107, pp. 7087-7092.
Sathaye S., et al., "Engineering Complementary Hydrophobic Interactions to Control ß-hairpin Peptide Self-assembly, Network Branching, and Hydrogel Properties", Biomacromolecules, Nov. 2014, vol. 15, No. 11, pp. 3891-3900 (22 Pages).
Schnolzer M., et al., "Constructing Proteins by Dovetailing Unprotected Synthetic Peptides: Backbone-engineered HIV Protease", Science, Apr. 10, 1992, vol. 256, pp. 221-225.
Tam J.P., et al., "Specificity and Formation of Unusual Amino Acids of an Amide Ligation Strategy for Unprotected Peptides", International Journal of Peptide and Protein Research, 1995, vol. 45, pp. 209-216.
Yamashiro D., et al., "New Segment Synthesis of a-inhibin-92 by the Acyl Disulfide Method", International Journal of Peptide and Protein Research, 1998, vol. 31, pp. 322-334.

\* cited by examiner

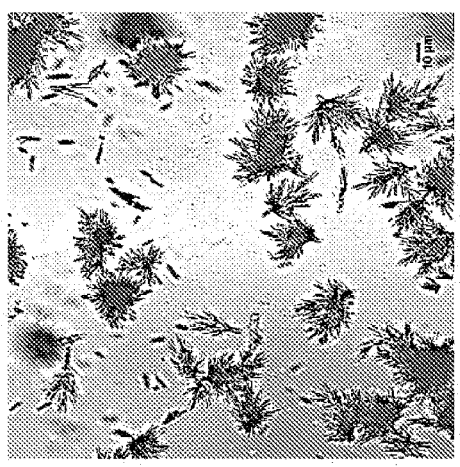
FIG. 2D
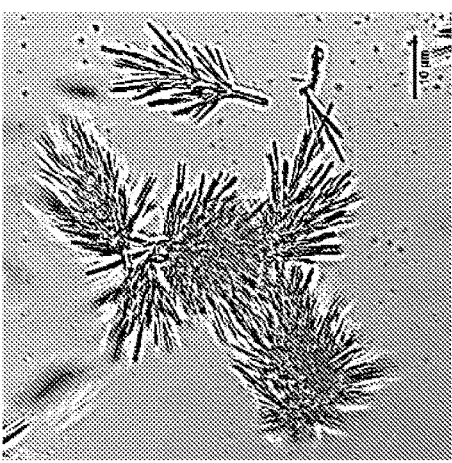
FIG. 2E
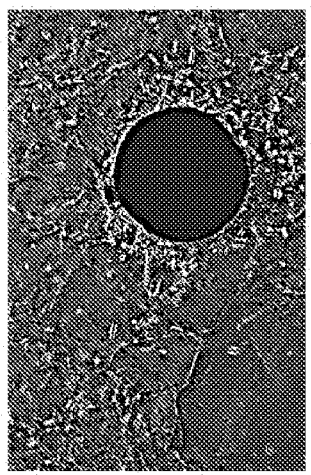
FIG. 2A
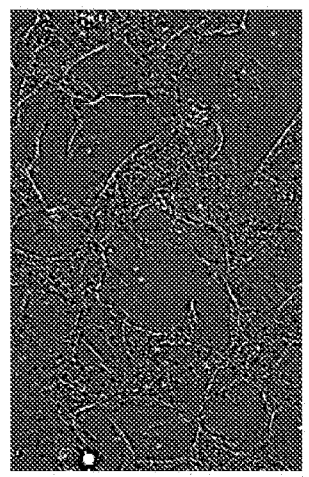
FIG. 2B
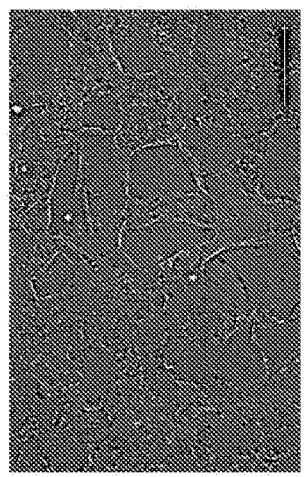
FIG. 2C
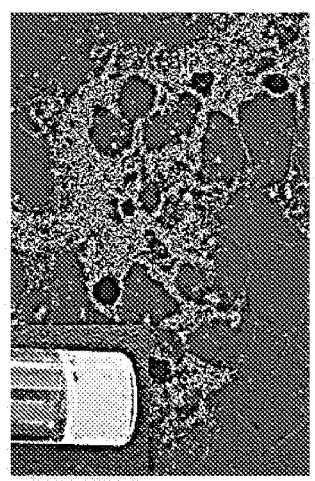

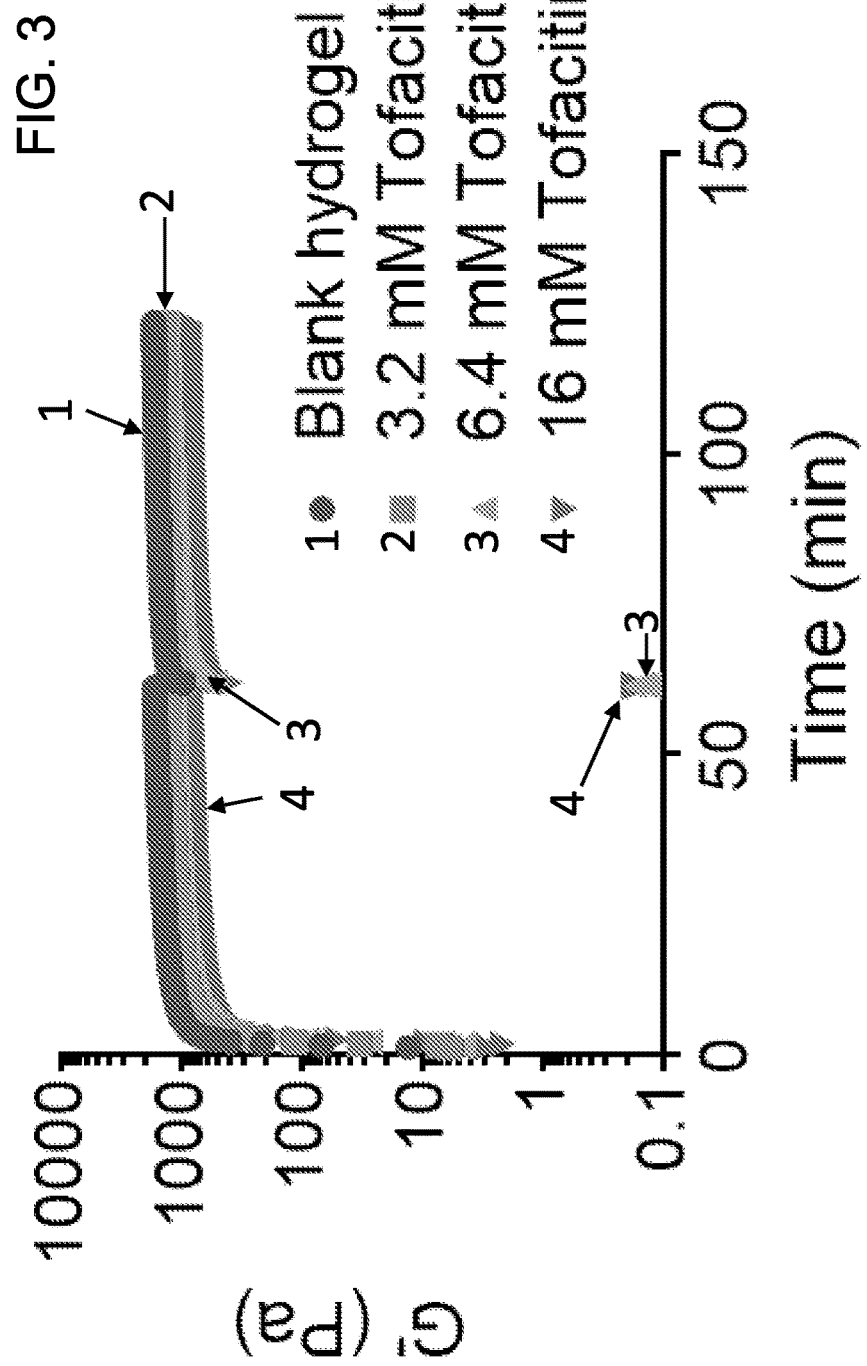

SEQUENCE LISTING

```
<160> NUMBER OF SEQ ID NOS: 34

<210> SEQ ID NO 1
<211> LENGTH: 24
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa can be any one of F, I, L, M, T, V, W, and
      Y, or is not present
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa can be any one of F, I, L, M, T, V, W, and
      Y, or is not present
<220> FEATURE:
<221> NAME/KEY: MISC_FEATURE
<222> LOCATION: (4)..(4)
<223> OTHER INFORMATION: Xaa can be any amino acid or is not present if
      X3 is not present
<220> FEATURE:
<221> NAME/KEY: MISC_FEATURE
<222> LOCATION: (5)..(5)
<223> OTHER INFORMATION: Xaa can be any one of F, I, L, M, T, V, W, and
      Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa can be any one of F, I, L, M, T, V, W, and
      Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa can be any one of F, I, L, M, T, V, W, and
      Y
<220> FEATURE:
<221> NAME/KEY: misc_feature
<222> LOCATION: (10)..(10)
<223> OTHER INFORMATION: Xaa can be any naturally occurring amino acid
<220> FEATURE:
<221> NAME/KEY: MISC_FEATURE
<222> LOCATION: (11)..(11)
<223> OTHER INFORMATION: Xaa can be any one of F, I, L, M, T, V, W, and
      Y
<220> FEATURE:
<221> NAME/KEY: MISC_FEATURE
<222> LOCATION: (14)..(14)
<223> OTHER INFORMATION: Xaa can be any one of F, I, L, M, T, V, W, and
```

```
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa can be any one of F, I, L, M, T, V, W, and
      Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa can be any one of F, I, L, M, T, V, W, and
      Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa can be any one of F, I, L, M, T, V, W, and
      Y
<220> FEATURE:
<221> NAME/KEY: misc_feature
<222> LOCATION: (21)..(21)
<223> OTHER INFORMATION: Xaa can be any naturally occurring amino acid
<220> FEATURE:
<221> NAME/KEY: MISC_FEATURE
<222> LOCATION: (22)..(22)
<223> OTHER INFORMATION: Xaa can be any one of F, I, L, M, T, V, W, and
      Y, or is not present if X3 is not present
<220> FEATURE:
<221> NAME/KEY: MISC_FEATURE
<222> LOCATION: (23)..(23)
<223> OTHER INFORMATION: Xaa can be any amino acid or is not present if
      X3 is not present
<220> FEATURE:
<221> NAME/KEY: MISC_FEATURE
<222> LOCATION: (24)..(24)
<223> OTHER INFORMATION: Xaa can be any one of F, I, L, M, T, V, W, and
      Y, or is not present if X1 is not present

<400> SEQUENCE: 1

Xaa Xaa Xaa Xaa Xaa Xaa Xaa Xaa Xaa Xaa Xaa Asn Gly Xaa Xaa Xaa
1               5                   10                  15

Xaa Xaa Xaa Xaa Xaa Xaa Xaa Xaa
            20

<210> SEQ ID NO 2
<211> LENGTH: 20
<212> TYPE: PRT
<213> ORGANISM: Artificial sequence
<220> FEATURE:
<223> OTHER INFORMATION: Syntehtic peptide

<400> SEQUENCE: 2

Val Leu Thr Lys Val Lys Thr Lys Val Asn Gly Thr Lys Val Glu Val
1               5                   10                  15

Lys Val Leu Val
            20

<210> SEQ ID NO 3
<211> LENGTH: 16
<212> TYPE: PRT
<213> ORGANISM: Artificial sequence
<220> FEATURE:
<223> OTHER INFORMATION: Syntehtic peptide
```

```
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: MISC_FEATURE
<222> LOCATION: (10)..(10)
<223> OTHER INFORMATION: Xaa is individually selected from V, I, L, M,
      T, F, W, and Y
<220> FEATURE:
<221> NAME/KEY: misc_feature
<222> LOCATION: (11)..(11)
<223> OTHER INFORMATION: Xaa can be any naturally occurring amino acid
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y

<400> SEQUENCE: 3

Xaa Xaa Xaa Xaa Xaa Xaa Xaa Pro Pro Xaa Xaa Xaa Xaa Xaa Xaa Xaa
1               5                   10                  15

<210> SEQ ID NO 4
<211> LENGTH: 18
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
```

```
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: MISC_FEATURE
<222> LOCATION: (10)..(10)
<223> OTHER INFORMATION: Xaa is individually selected from V, I, L, M,
      T, F, W, and Y
<220> FEATURE:
<221> NAME/KEY: misc_feature
<222> LOCATION: (11)..(11)
<223> OTHER INFORMATION: Xaa can be any naturally occurring amino acid
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y

<400> SEQUENCE: 4

Xaa Xaa Xaa Xaa Xaa Xaa Xaa Pro Pro Xaa Xaa Xaa Xaa Xaa Xaa Xaa
1               5                   10                  15

Xaa Xaa
```

```
<210> SEQ ID NO 5
<211> LENGTH: 20
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: MISC_FEATURE
<222> LOCATION: (10)..(10)
<223> OTHER INFORMATION: Xaa is individually selected from V, I, L, M,
      T, F, W, and Y
<220> FEATURE:
<221> NAME/KEY: misc_feature
<222> LOCATION: (11)..(11)
<223> OTHER INFORMATION: Xaa can be any naturally occurring amino acid
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
```

```
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y

<400> SEQUENCE: 5

Xaa Xaa Xaa Xaa Xaa Xaa Xaa Pro Pro Xaa Xaa Xaa Xaa Xaa Xaa Xaa
1               5                   10                  15

Xaa Xaa Xaa Xaa
            20

<210> SEQ ID NO 6
<211> LENGTH: 18
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
```

```
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(18)
<223> OTHER INFORMATION: Xaa can be any naturally occurring amino acid

<400> SEQUENCE: 6

Xaa Xaa Xaa Xaa Xaa Xaa Xaa Xaa Xaa Pro Pro Xaa Xaa Xaa Xaa Xaa
1               5                   10                  15

Xaa Xaa

<210> SEQ ID NO 7
<211> LENGTH: 20
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
```

-continued

```
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y

<400> SEQUENCE: 7

Xaa Xaa Xaa Xaa Xaa Xaa Xaa Xaa Xaa Pro Pro Xaa Xaa Xaa Xaa Xaa
1               5                   10                  15

Xaa Xaa Xaa Xaa
            20

<210> SEQ ID NO 8
<211> LENGTH: 22
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
```

```
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y
<220> FEATURE:
<221> NAME/KEY: misc_feature
<222> LOCATION: (21)..(21)
<223> OTHER INFORMATION: Xaa can be any naturally occurring amino acid
<220> FEATURE:
<221> NAME/KEY: MISC_FEATURE
<222> LOCATION: (22)..(22)
<223> OTHER INFORMATION: Xaa is individually selected from V, I, L, M,
      T, F, W, and Y

<400> SEQUENCE: 8

Xaa Xaa Xaa Xaa Xaa Xaa Xaa Xaa Xaa Pro Pro Xaa Xaa Xaa Xaa Xaa
1               5                   10                  15

Xaa Xaa Xaa Xaa Xaa Xaa
            20

<210> SEQ ID NO 9
<211> LENGTH: 20
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
```

```
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: misc_feature
<222> LOCATION: (10)..(10)
<223> OTHER INFORMATION: Xaa can be any naturally occurring amino acid
<220> FEATURE:
<221> NAME/KEY: MISC_FEATURE
<222> LOCATION: (11)..(11)
<223> OTHER INFORMATION: Xaa is individually selected from V, I, L, M,
      T, F, W, and Y
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
```

T, F, W, and Y

<400> SEQUENCE: 9

Xaa Xaa Xaa Xaa Xaa Xaa Xaa Xaa Xaa Xaa Pro Pro Xaa Xaa Xaa
1               5                   10                  15

Xaa Xaa Xaa Xaa
            20

<210> SEQ ID NO 10
<211> LENGTH: 22
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: misc_feature
<222> LOCATION: (10)..(10)
<223> OTHER INFORMATION: Xaa can be any naturally occurring amino acid
<220> FEATURE:
<221> NAME/KEY: MISC_FEATURE
<222> LOCATION: (11)..(11)
<223> OTHER INFORMATION: Xaa is individually selected from V, I, L, M,
      T, F, W, and Y
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)

```
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y
<220> FEATURE:
<221> NAME/KEY: misc_feature
<222> LOCATION: (21)..(21)
<223> OTHER INFORMATION: Xaa can be any naturally occurring amino acid
<220> FEATURE:
<221> NAME/KEY: MISC_FEATURE
<222> LOCATION: (22)..(22)
<223> OTHER INFORMATION: Xaa is individually selected from V, I, L, M,
      T, F, W, and Y

<400> SEQUENCE: 10

Xaa Xaa Xaa Xaa Xaa Xaa Xaa Xaa Xaa Xaa Xaa Pro Pro Xaa Xaa Xaa
1               5                   10                  15

Xaa Xaa Xaa Xaa Xaa Xaa
            20

<210> SEQ ID NO 11
<211> LENGTH: 24
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
```

```
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: misc_feature
<222> LOCATION: (10)..(10)
<223> OTHER INFORMATION: Xaa can be any naturally occurring amino acid
<220> FEATURE:
<221> NAME/KEY: MISC_FEATURE
<222> LOCATION: (11)..(11)
<223> OTHER INFORMATION: Xaa is individually selected from V, I, L, M,
      T, F, W, and Y
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y
<220> FEATURE:
<221> NAME/KEY: misc_feature
<222> LOCATION: (21)..(21)
<223> OTHER INFORMATION: Xaa can be any naturally occurring amino acid
<220> FEATURE:
<221> NAME/KEY: MISC_FEATURE
<222> LOCATION: (22)..(22)
<223> OTHER INFORMATION: Xaa is individually selected from V, I, L, M,
      T, F, W, and Y
<220> FEATURE:
<221> NAME/KEY: misc_feature
<222> LOCATION: (23)..(23)
<223> OTHER INFORMATION: Xaa can be any naturally occurring amino acid
<220> FEATURE:
<221> NAME/KEY: MISC_FEATURE
<222> LOCATION: (24)..(24)
<223> OTHER INFORMATION: Xaa is individually selected from V, I, L, M,
      T, F, W, and Y

<400> SEQUENCE: 11

Xaa Xaa Xaa Xaa Xaa Xaa Xaa Xaa Xaa Xaa Xaa Pro Pro Xaa Xaa Xaa
1               5                   10                  15

Xaa Xaa Xaa Xaa Xaa Xaa Xaa Xaa
            20

<210> SEQ ID NO 12
<211> LENGTH: 16
<212> TYPE: PRT
```

```
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: MISC_FEATURE
<222> LOCATION: (10)..(10)
<223> OTHER INFORMATION: Xaa is individually selected from V, I, L, M,
      T, F, W, and Y
<220> FEATURE:
<221> NAME/KEY: misc_feature
<222> LOCATION: (11)..(11)
<223> OTHER INFORMATION: Xaa can be any naturally occurring amino acid
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y

<400> SEQUENCE: 12

Xaa Xaa Xaa Xaa Xaa Xaa Xaa Pro Gly Xaa Xaa Xaa Xaa Xaa Xaa Xaa
1               5                   10                  15

<210> SEQ ID NO 13
<211> LENGTH: 18
<212> TYPE: PRT
<213> ORGANISM: Artificial sequence
<220> FEATURE:
```

```
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: MISC_FEATURE
<222> LOCATION: (10)..(10)
<223> OTHER INFORMATION: Xaa is individually selected from V, I, L, M,
      T, F, W, and Y
<220> FEATURE:
<221> NAME/KEY: misc_feature
<222> LOCATION: (11)..(11)
<223> OTHER INFORMATION: Xaa can be any naturally occurring amino acid
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y

<400> SEQUENCE: 13

Xaa Xaa Xaa Xaa Xaa Xaa Xaa Pro Gly Xaa Xaa Xaa Xaa Xaa Xaa Xaa
1               5                   10                  15
```

Xaa Xaa

<210> SEQ ID NO 14
<211> LENGTH: 20
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
    T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
    T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
    T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
    T, F, W, and Y
<220> FEATURE:
<221> NAME/KEY: MISC_FEATURE
<222> LOCATION: (10)..(10)
<223> OTHER INFORMATION: Xaa is individually selected from V, I, L, M,
    T, F, W, and Y
<220> FEATURE:
<221> NAME/KEY: misc_feature
<222> LOCATION: (11)..(11)
<223> OTHER INFORMATION: Xaa can be any naturally occurring amino acid
<220> FEATURE:
<221> NAME/KEY: MISC_FEATURE
<222> LOCATION: (12)..(12)
<223> OTHER INFORMATION: Xaa is individually selected from V, I, L, M,
    T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
    T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
    T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:

-continued

```
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y

<400> SEQUENCE: 14

Xaa Xaa Xaa Xaa Xaa Xaa Xaa Pro Gly Xaa Xaa Xaa Xaa Xaa Xaa Xaa
1               5                   10                  15

Xaa Xaa Xaa Xaa
            20

<210> SEQ ID NO 15
<211> LENGTH: 18
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
```

```
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y

<400> SEQUENCE: 15

Xaa Xaa Xaa Xaa Xaa Xaa Xaa Xaa Xaa Pro Gly Xaa Xaa Xaa Xaa Xaa
1               5                   10                  15

Xaa Xaa

<210> SEQ ID NO 16
<211> LENGTH: 20
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
```

```
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y

<400> SEQUENCE: 16

Xaa Xaa Xaa Xaa Xaa Xaa Xaa Xaa Xaa Pro Gly Xaa Xaa Xaa Xaa Xaa
1               5                   10                  15

Xaa Xaa Xaa Xaa
            20

<210> SEQ ID NO 17
<211> LENGTH: 22
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
```

```
                T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y
<220> FEATURE:
<221> NAME/KEY: misc_feature
<222> LOCATION: (21)..(21)
<223> OTHER INFORMATION: Xaa can be any naturally occurring amino acid
<220> FEATURE:
<221> NAME/KEY: MISC_FEATURE
<222> LOCATION: (22)..(22)
<223> OTHER INFORMATION: Xaa is individually selected from V, I, L, M,
      T, F, W, and Y

<400> SEQUENCE: 17

Xaa Xaa Xaa Xaa Xaa Xaa Xaa Xaa Xaa Pro Gly Xaa Xaa Xaa Xaa Xaa
1               5                   10                  15

Xaa Xaa Xaa Xaa Xaa Xaa
            20
```

```
<210> SEQ ID NO 18
<211> LENGTH: 20
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: misc_feature
<222> LOCATION: (10)..(10)
<223> OTHER INFORMATION: Xaa can be any naturally occurring amino acid
<220> FEATURE:
<221> NAME/KEY: MISC_FEATURE
<222> LOCATION: (11)..(11)
<223> OTHER INFORMATION: Xaa is individually selected from V, I, L, M,
      T, F, W, and Y
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
```

```
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y

<400> SEQUENCE: 18

Xaa Xaa Xaa Xaa Xaa Xaa Xaa Xaa Xaa Xaa Xaa Pro Gly Xaa Xaa Xaa
1               5                   10                  15

Xaa Xaa Xaa Xaa
            20

<210> SEQ ID NO 19
<211> LENGTH: 22
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: misc_feature
<222> LOCATION: (10)..(10)
<223> OTHER INFORMATION: Xaa can be any naturally occurring amino acid
<220> FEATURE:
<221> NAME/KEY: MISC_FEATURE
<222> LOCATION: (11)..(11)
<223> OTHER INFORMATION: Xaa is individually selected from V, I, L, M,
      T, F, W, and Y
<220> FEATURE:
<221> NAME/KEY: MISC_FEATURE
<222> LOCATION: (14)..(14)
<223> OTHER INFORMATION: Xaa is individually selected from V, I, L, M,
```

```
        T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
        T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
        T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
        T, F, W, and Y
<220> FEATURE:
<221> NAME/KEY: misc_feature
<222> LOCATION: (21)..(21)
<223> OTHER INFORMATION: Xaa can be any naturally occurring amino acid
<220> FEATURE:
<221> NAME/KEY: MISC_FEATURE
<222> LOCATION: (22)..(22)
<223> OTHER INFORMATION: Xaa is individually selected from V, I, L, M,
        T, F, W, and Y

<400> SEQUENCE: 19

Xaa Xaa Xaa Xaa Xaa Xaa Xaa Xaa Xaa Xaa Xaa Pro Gly Xaa Xaa Xaa
1               5                   10                  15

Xaa Xaa Xaa Xaa Xaa Xaa
            20

<210> SEQ ID NO 20
<211> LENGTH: 24
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
        T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
        T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
        T, F, W, and Y
<220> FEATURE:
<221> NAME/KEY: misc_feature
<222> LOCATION: (6)..(6)
```

```
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: misc_feature
<222> LOCATION: (10)..(10)
<223> OTHER INFORMATION: Xaa can be any naturally occurring amino acid
<220> FEATURE:
<221> NAME/KEY: MISC_FEATURE
<222> LOCATION: (11)..(11)
<223> OTHER INFORMATION: Xaa is individually selected from V, I, L, M,
      T, F, W, and Y
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y
<220> FEATURE:
<221> NAME/KEY: misc_feature
<222> LOCATION: (21)..(21)
<223> OTHER INFORMATION: Xaa can be any naturally occurring amino acid
<220> FEATURE:
<221> NAME/KEY: MISC_FEATURE
<222> LOCATION: (22)..(22)
<223> OTHER INFORMATION: Xaa is individually selected from V, I, L, M,
      T, F, W, and Y
<220> FEATURE:
<221> NAME/KEY: misc_feature
<222> LOCATION: (23)..(23)
<223> OTHER INFORMATION: Xaa can be any naturally occurring amino acid
<220> FEATURE:
<221> NAME/KEY: MISC_FEATURE
<222> LOCATION: (24)..(24)
<223> OTHER INFORMATION: Xaa is individually selected from V, I, L, M,
      T, F, W, and Y

<400> SEQUENCE: 20

Xaa Xaa Xaa Xaa Xaa Xaa Xaa Xaa Xaa Xaa Xaa Pro Gly Xaa Xaa Xaa
1               5                   10                  15
```

Xaa Xaa Xaa Xaa Xaa Xaa Xaa Xaa
            20

<210> SEQ ID NO 21
<211> LENGTH: 16
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: MISC_FEATURE
<222> LOCATION: (10)..(10)
<223> OTHER INFORMATION: Xaa is individually selected from V, I, L, M,
      T, F, W, and Y
<220> FEATURE:
<221> NAME/KEY: misc_feature
<222> LOCATION: (11)..(11)
<223> OTHER INFORMATION: Xaa can be any naturally occurring amino acid
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y

<400> SEQUENCE: 21

Xaa Xaa Xaa Xaa Xaa Xaa Xaa Asn Gly Xaa Xaa Xaa Xaa Xaa Xaa Xaa

-continued

```
<210> SEQ ID NO 22
<211> LENGTH: 18
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: MISC_FEATURE
<222> LOCATION: (10)..(10)
<223> OTHER INFORMATION: Xaa is individually selected from V, I, L, M,
      T, F, W, and Y
<220> FEATURE:
<221> NAME/KEY: misc_feature
<222> LOCATION: (11)..(11)
<223> OTHER INFORMATION: Xaa can be any naturally occurring amino acid
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
```

```
<222> LOCATION: (18)..(18)
<223> OTHER INFORMATION: Xaa is individually selected from V, I, L, M,
      T, F, W, and Y

<400> SEQUENCE: 22

Xaa Xaa Xaa Xaa Xaa Xaa Xaa Asn Gly Xaa Xaa Xaa Xaa Xaa Xaa Xaa
1               5                   10                  15

Xaa Xaa

<210> SEQ ID NO 23
<211> LENGTH: 20
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: MISC_FEATURE
<222> LOCATION: (10)..(10)
<223> OTHER INFORMATION: Xaa is individually selected from V, I, L, M,
      T, F, W, and Y
<220> FEATURE:
<221> NAME/KEY: misc_feature
<222> LOCATION: (11)..(11)
<223> OTHER INFORMATION: Xaa can be any naturally occurring amino acid
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
```

```
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y

<400> SEQUENCE: 23

Xaa Xaa Xaa Xaa Xaa Xaa Xaa Asn Gly Xaa Xaa Xaa Xaa Xaa Xaa Xaa
1               5                   10                  15

Xaa Xaa Xaa Xaa
            20

<210> SEQ ID NO 24
<211> LENGTH: 18
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
```

```
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y

<400> SEQUENCE: 24

Xaa Xaa Xaa Xaa Xaa Xaa Xaa Xaa Xaa Asn Gly Xaa Xaa Xaa Xaa Xaa
1               5                   10                  15

Xaa Xaa

<210> SEQ ID NO 25
<211> LENGTH: 20
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
```

```
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y

<400> SEQUENCE: 25

Xaa Xaa Xaa Xaa Xaa Xaa Xaa Xaa Xaa Asn Gly Xaa Xaa Xaa Xaa Xaa
1               5                   10                  15

Xaa Xaa Xaa Xaa
            20

<210> SEQ ID NO 26
<211> LENGTH: 22
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
```

```
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: MISC_FEATURE
<222> LOCATION: (12)..(12)
<223> OTHER INFORMATION: Xaa is individually selected from V, I, L, M,
      T, F, W, and Y
<220> FEATURE:
<221> NAME/KEY: misc_feature
<222> LOCATION: (13)..(13)
<223> OTHER INFORMATION: Xaa can be any naturally occurring amino acid
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y
<220> FEATURE:
<221> NAME/KEY: misc_feature
<222> LOCATION: (21)..(21)
<223> OTHER INFORMATION: Xaa can be any naturally occurring amino acid
<220> FEATURE:
<221> NAME/KEY: MISC_FEATURE
<222> LOCATION: (22)..(22)
<223> OTHER INFORMATION: Xaa is individually selected from V, I, L, M,
      T, F, W, and Y

<400> SEQUENCE: 26
```

```
Xaa Xaa Xaa Xaa Xaa Xaa Xaa Xaa Asn Gly Xaa Xaa Xaa Xaa Xaa
1               5                   10                  15

Xaa Xaa Xaa Xaa Xaa Xaa
            20

<210> SEQ ID NO 27
<211> LENGTH: 20
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: misc_feature
<222> LOCATION: (10)..(10)
<223> OTHER INFORMATION: Xaa can be any naturally occurring amino acid
<220> FEATURE:
<221> NAME/KEY: MISC_FEATURE
<222> LOCATION: (11)..(11)
<223> OTHER INFORMATION: Xaa is individually selected from V, I, L, M,
      T, F, W, and Y
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
```

```
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y

<400> SEQUENCE: 27

Xaa Xaa Xaa Xaa Xaa Xaa Xaa Xaa Xaa Xaa Xaa Asn Gly Xaa Xaa Xaa
1               5                   10                  15

Xaa Xaa Xaa Xaa
            20

<210> SEQ ID NO 28
<211> LENGTH: 22
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: misc_feature
<222> LOCATION: (10)..(10)
<223> OTHER INFORMATION: Xaa can be any naturally occurring amino acid
<220> FEATURE:
```

```
<221> NAME/KEY: MISC_FEATURE
<222> LOCATION: (11)..(11)
<223> OTHER INFORMATION: Xaa is individually selected from V, I, L, M,
      T, F, W, and Y
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y
<220> FEATURE:
<221> NAME/KEY: misc_feature
<222> LOCATION: (21)..(21)
<223> OTHER INFORMATION: Xaa can be any naturally occurring amino acid
<220> FEATURE:
<221> NAME/KEY: MISC_FEATURE
<222> LOCATION: (22)..(22)
<223> OTHER INFORMATION: Xaa is individually selected from V, I, L, M,
      T, F, W, and Y

<400> SEQUENCE: 28

Xaa Xaa Xaa Xaa Xaa Xaa Xaa Xaa Xaa Xaa Xaa Asn Gly Xaa Xaa Xaa
1               5                   10                  15

Xaa Xaa Xaa Xaa Xaa Xaa
            20

<210> SEQ ID NO 29
<211> LENGTH: 24
<212> TYPE: PRT
<213> ORGANISM: Artificial sequence
<220> FEATURE:
<223> OTHER INFORMATION: Syntehtic peptide
<220> FEATURE:
<221> NAME/KEY: MISC_FEATURE
<222> LOCATION: (1)..(1)
<223> OTHER INFORMATION: Xaa is individually selected from V, I, L, M,
      T, F, W, and Y
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: MISC_FEATURE
<222> LOCATION: (3)..(3)
<223> OTHER INFORMATION: Xaa is individually selected from V, I, L, M,
      T, F, W, and Y
<220> FEATURE:
<221> NAME/KEY: misc_feature
<222> LOCATION: (4)..(4)
<223> OTHER INFORMATION: Xaa can be any naturally occurring amino acid
```

```
<220> FEATURE:
<221> NAME/KEY: MISC_FEATURE
<222> LOCATION: (5)..(5)
<223> OTHER INFORMATION: Xaa is individually selected from V, I, L, M,
      T, F, W, and Y
<220> FEATURE:
<221> NAME/KEY: misc_feature
<222> LOCATION: (6)..(6)
<223> OTHER INFORMATION: Xaa can be any naturally occurring amino acid
<220> FEATURE:
<221> NAME/KEY: MISC_FEATURE
<222> LOCATION: (7)..(7)
<223> OTHER INFORMATION: Xaa is individually selected from V, I, L, M,
      T, F, W, and Y
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: MISC_FEATURE
<222> LOCATION: (9)..(9)
<223> OTHER INFORMATION: Xaa is individually selected from V, I, L, M,
      T, F, W, and Y
<220> FEATURE:
<221> NAME/KEY: misc_feature
<222> LOCATION: (10)..(10)
<223> OTHER INFORMATION: Xaa can be any naturally occurring amino acid
<220> FEATURE:
<221> NAME/KEY: MISC_FEATURE
<222> LOCATION: (11)..(11)
<223> OTHER INFORMATION: Xaa is individually selected from V, I, L, M,
      T, F, W, and Y
<220> FEATURE:
<221> NAME/KEY: MISC_FEATURE
<222> LOCATION: (14)..(14)
<223> OTHER INFORMATION: Xaa is individually selected from V, I, L, M,
      T, F, W, and Y
<220> FEATURE:
<221> NAME/KEY: misc_feature
<222> LOCATION: (15)..(15)
<223> OTHER INFORMATION: Xaa can be any naturally occurring amino acid
<220> FEATURE:
<221> NAME/KEY: MISC_FEATURE
<222> LOCATION: (16)..(16)
<223> OTHER INFORMATION: Xaa is individually selected from V, I, L, M,
      T, F, W, and Y
<220> FEATURE:
<221> NAME/KEY: misc_feature
<222> LOCATION: (17)..(17)
<223> OTHER INFORMATION: Xaa can be any naturally occurring amino acid
<220> FEATURE:
<221> NAME/KEY: MISC_FEATURE
<222> LOCATION: (18)..(18)
<223> OTHER INFORMATION: Xaa is individually selected from V, I, L, M,
      T, F, W, and Y
<220> FEATURE:
<221> NAME/KEY: misc_feature
<222> LOCATION: (19)..(19)
<223> OTHER INFORMATION: Xaa can be any naturally occurring amino acid
<220> FEATURE:
<221> NAME/KEY: MISC_FEATURE
<222> LOCATION: (20)..(20)
<223> OTHER INFORMATION: Xaa is individually selected from V, I, L, M,
      T, F, W, and Y
<220> FEATURE:
<221> NAME/KEY: misc_feature
<222> LOCATION: (21)..(23)
<223> OTHER INFORMATION: Xaa can be any naturally occurring amino acid
<220> FEATURE:
<221> NAME/KEY: MISC_FEATURE
<222> LOCATION: (24)..(24)
<223> OTHER INFORMATION: Xaa is individually selected from V, I, L, M,
      T, F, W, and Y

<400> SEQUENCE: 29

Xaa Xaa Xaa Xaa Xaa Xaa Xaa Xaa Xaa Xaa Xaa Asn Gly Xaa Xaa Xaa
1               5                   10                  15
```

Xaa Xaa Xaa Xaa Xaa Xaa Xaa Xaa
            20

<210> SEQ ID NO 30
<211> LENGTH: 20
<212> TYPE: PRT
<213> ORGANISM: Artificial sequence
<220> FEATURE:
<223> OTHER INFORMATION: Syntehtic peptide

<400> SEQUENCE: 30

Val Leu Thr Lys Val Lys Thr Lys Val Pro Pro Thr Lys Val Glu Val
1               5                   10                  15

Lys Val Leu Val
            20

<210> SEQ ID NO 31
<211> LENGTH: 20
<212> TYPE: PRT
<213> ORGANISM: Artificial sequence
<220> FEATURE:
<223> OTHER INFORMATION: Syntehtic peptide

<400> SEQUENCE: 31

Val Lys Val Lys Val Lys Val Lys Val Pro Pro Thr Lys Val Lys Val
1               5                   10                  15

Lys Val Lys Val
            20

<210> SEQ ID NO 32
<211> LENGTH: 20
<212> TYPE: PRT
<213> ORGANISM: Artificial sequence
<220> FEATURE:
<223> OTHER INFORMATION: Syntehtic peptide

<400> SEQUENCE: 32

Val Leu Thr Lys Val Lys Thr Lys Val Pro Gly Thr Lys Val Glu Val
1               5                   10                  15

Lys Val Leu Val
            20

<210> SEQ ID NO 33
<211> LENGTH: 20
<212> TYPE: PRT
<213> ORGANISM: Artificial sequence
<220> FEATURE:
<223> OTHER INFORMATION: Syntehtic peptide

<400> SEQUENCE: 33

Val Lys Val Lys Val Lys Val Lys Val Pro Pro Thr Lys Val Glu Val
1               5                   10                  15

Lys Val Lys Val
            20

<210> SEQ ID NO 34
<211> LENGTH: 4
<212> TYPE: PRT
<213> ORGANISM: Artificial sequence

```
<220> FEATURE:
<223> OTHER INFORMATION: Syntehtic peptide

<400> SEQUENCE: 34

Val Pro Pro Thr
1
```

PEPTIDE HYDROGELS FOR DELIVERY OF IMMUNOSUPPRESSIVE DRUGS AND USES THEREOF

CROSS-REFERENCE TO RELATED APPLICATIONS

This application is a 35 U.S.C. § 371 U.S. national entry of International Application PCT/US2019/030656, having an international filing date of May 3, 2019, which claims the benefit of U.S. Provisional Application No. 62/666,471, filed May 3, 2018, the content of each of the aforementioned applications is herein incorporated by reference in their entirety.

STATEMENT REGARDING FEDERALLY SPONSORED RESEARCH AND DEVELOPMENT

This invention was made with Government Support under project number ZIA BC 011313 awarded by the National Institutes of Health, National Cancer Institute. The Government has certain rights in this invention.

INCORPORATION-BY-REFERENCE OF MATERIAL SUBMITTED ELECTRONICALLY

This application contains a sequence listing. It has been submitted electronically via EFS-Web as an ASCII text file entitled "Sequence_Listing.txt". The sequence listing is 4,000 bytes in size, and was created on May 3, 2019. It is hereby incorporated by reference in its entirety.

FIELD

This disclosure concerns peptide hydrogels containing immunosuppressive small molecule drugs and their use, such as for inhibiting allograft rejection.

BACKGROUND

In the context of organ transplantation therapy, immunosuppressive agents are typically administered systemically and chronically to enhance transplant survival. However, immunosuppressive drugs are known to cause deleterious and dose-limiting side effects, including impairment of renal function, hypercholesterolemia, hypertension and lymphatic malignancy. Longer graft survival has been strongly correlated with reduced drug-associated toxicity, highlighting the importance of identifying improved strategies for preventing allograft rejection.

SUMMARY

Compositions that allow for the local delivery of an immunosuppressive small molecule drug are described. The compositions include a peptide hydrogel containing the immunosuppressive small molecule drug in crystalline form. Crystallization of the small molecule within the fibril network of the hydrogel results in sustained release of the drug at the site of administration. Local delivery of the drug minimizes drug-associated toxicity that is typically observed following systemic administration.

Provided herein are compositions that include a cationic amphiphilic peptide hydrogel and a crystallized immunosuppressive small molecule drug dispersed within the peptide hydrogel.

In some embodiments, the amino acid sequence of the peptide comprises or consists of the amino acid sequence set forth as:

$(XZ)_n$-[$^D$PP, $^D$PG, or NG]-$X(ZX)_n$ (SEQ ID NOs: 3-29) wherein each X is individually selected from V, I, L, M, T, F, W, and Y; each Z is individually selected from any amino acid; n is from 3 to 5; and the peptide has a net positive charge at neutral pH.

In some embodiments, the immunosuppressive small molecule drug has a molecular weight of about 200 to about 2000 Da and a logP range of about −4 to about 4. In specific non-limiting examples, the immunosuppressive small molecule drug is tofacitinib, or a pharmaceutically acceptable salt or derivative thereof.

Also provided are syringes that include a composition disclosed herein.

Further provided is a method of inhibiting allograft rejection in a subject who has received an organ or tissue allograft. In some embodiments, the method includes administering a composition disclosed herein to the site of the allograft in the subject.

Also provided is a method of treating autoimmune injury of an organ in a subject suffering from an autoimmune disease. In some embodiments, the method includes administering a composition disclosed herein to the organ of the subject.

Further provided is a method of producing a composition comprising a crystallized immunosuppressive small molecule drug dispersed within a cationic amphiphilic peptide hydrogel. In some embodiments, the method includes preparing an aqueous solution of a cationic amphiphilic peptide; preparing an immunosuppressive small molecule drug free base solution comprising the drug in dimethyl sulfoxide (DMSO); preparing an immunosuppressive small molecule drug stock solution by adding the free base solution to HEPES-buffered saline; and mixing the immunosuppressive small molecule drug stock solution with the aqueous solution of the cationic amphiphilic peptide under conditions sufficient to form a peptide hydrogel.

Also provided is a composition comprising a crystallized immunosuppressive small molecule drug dispersed within a cationic amphiphilic peptide hydrogel produced by a method that includes preparing an aqueous solution of a cationic amphiphilic peptide; preparing an immunosuppressive small molecule drug free base solution comprising the drug in DMSO; preparing an immunosuppressive small molecule drug stock solution by adding the free base solution to HEPES-buffered saline; and mixing the immunosuppressive small molecule drug stock solution with the aqueous solution of peptide under conditions sufficient to form a peptide hydrogel.

The foregoing and other objects, features, and advantages of the invention will become more apparent from the following detailed description, which proceeds with reference to the accompanying figures.

BRIEF DESCRIPTION OF THE DRAWINGS

(FIG. 1A) Sustained release profile of tofacitinib free base vs burst release of tofacitinib citrate salt from MAX8 peptide hydrogel at early time points. (FIG. 1B) Release profiles of tofacitinib free base and citrate at longer time duration. (FIG. 1C) Variation of release profiles of tofacitinib free base based on the initial amount of drug loading. (FIG. 1D) Release profiles of tofacitinib free base from MAX1 and HLT2 peptide hydrogels. Concentration of tofacitinib free base was 16 mM. In each case, release of the drug was monitored from the hydrogel into an infinite sink (25 mM HEPES, 150 mM NaCl, pH 7.4) at 37° C. Lines are included for visual guidance.

FIGS. 2A-2E: Phase contrast images of tofacitinib free base encapsulated within MAX8 peptide hydrogel at the drug concentrations of 16 mM (FIG. 2A) and 1.6 mM (FIG. 2B). (FIG. 2C) Phase contrast images of blank MAX8 peptide hydrogel. Scale bar 200 µM. All images are at the same scale. (FIG. 2D) and (FIG. 2E) Confocal microscopy-generated differential interference contrast images of tofacitinib free base microcrystals dispersed in MAX8 peptide gel network at a drug concentration of 16 mM.

FIG. 3: Shear-thin recovery of MAX8 hydrogel loaded with tofacitinib free base at the drug concentrations of 3.2 mM, 6.4 mM and 16 mM. Gels were formed for 1 hour under 6 Rad/s angular frequency, 0.2% strain and shear-thinned at 1000% strain for 30 seconds. The gels were allowed to recover by reducing the strain to 0.2% during next 1 hour.

(FIG. 6A) Cumulative release profiles of tofacitinib (free base) from MAX8 hydrogel containing different volume ratios of DMSO versus hydrogel. In each case, the tofacitinib stock solution was prepared in DMSO and an increasing volume of the DMSO stock was added while constituting the hydrogel. The total concentration of loaded tofacitinib was constant at 16 mM. Release profile of the drug was monitored from the hydrogel into buffer (25 mM HEPES, 150 mM NaCl, pH 7.4) at 37° C. (FIG. 6B) Release rate of tofacitinib from MAX8 hydrogel containing varying volumes of DMSO during the first 4 hours.

SEQUENCE LISTING

Figure 1B:
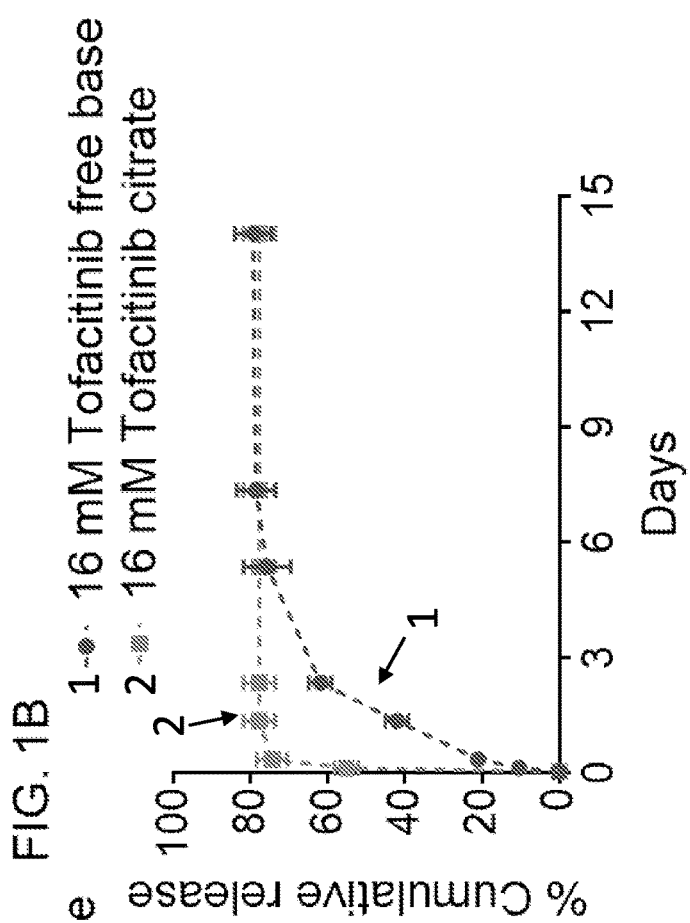
FIGS. 1A-1D: Release profiles of tofacitinib from peptide hydrogels.

The nucleic and amino acid sequences listed in the accompanying sequence listing are shown using standard letter abbreviations for nucleotide bases, and three letter code for amino acids, as defined in 37 C.F.R. 1.822. Only one strand of each nucleic acid sequence is shown, but the complementary strand is understood as included by any reference to the displayed strand. The Sequence Listing is submitted as an ASCII text file, created on May 2, 2019, 1.41 KB, which is incorporated by reference herein. In the accompanying sequence listing:

SEQ ID NOs: 1 and 2 are cationic amphiphilic peptide sequences.

DETAILED DESCRIPTION

I. Summary of Terms

Unless otherwise noted, technical terms are used according to conventional usage. As used herein, the singular forms "a," "an," and "the," refer to both the singular as well as plural, unless the context clearly indicates otherwise. For example, the term "a peptide" includes single or plural peptides and can be considered equivalent to the phrase "at least one peptide." As used herein, the term "comprises" means "includes." Thus, "comprising a peptide" means "including a peptide" without excluding other elements. It is further to be understood that any and all base sizes or amino acid sizes, and all molecular weight or molecular mass values, given for nucleic acids or polypeptides are approximate, and are provided for descriptive purposes, unless otherwise indicated. Although many methods and materials similar or equivalent to those described herein can be used, particular suitable methods and materials are described below. In case of conflict, the present specification, including explanations of terms, will control. In addition, the materials, methods, and examples are illustrative only and not intended to be limiting. To facilitate review of the various embodiments, the following explanations of terms are provided:

About: Unless context indicates otherwise, "about" refers to plus or minus 5% of a reference value. For example, "about" 100 refers to 95 to 105.

Administration: The introduction of a composition into a subject by a chosen route. Exemplary routes of administration include, but are not limited to, injection (such as intraocular, subcutaneous, intramuscular, intradermal, intraperitoneal, and intravenous), oral, intraductal, sublingual, transdermal, intranasal, topical, inhalation routes and via a medical implant. In some embodiments of the present disclosure, the composition is administered locally to a particular tissue or organ, such as by injection. In some instances, surgery is required for local delivery, such as local delivery to an organ.

Allograft: The transplant of an organ, tissue or cells from a donor to a recipient who is genetically non-identical to the donor. A variety of cells, tissues and organs can be used for allografts, including, but not limited to, heart, lung, liver, kidney, pancreas, intestine, skin, bone, ligament, tendon, cornea, face, limbs, islet cells, and bone marrow.

Allograft rejection: When transplanted cells, tissue or an organ are rejected by the recipient's immune system. This process can be inhibited using immunosuppressant drugs.

Autoimmune disease: A disorder in which the immune system produces an immune response (e.g. a B cell and/or a T cell response) against an endogenous antigen, with consequent injury to tissues. In some embodiments of the present disclosure, the subject to be treated is one suffering from an autoimmune disease that results in autoimmune injury to a specific organ or tissue, for example, type 1 diabetes, inflammatory bowel disease (e.g. Crohn's disease or ulcerative colitis), Sjögren's syndrome, or Hashimoto's thyroiditis.

Autoimmune injury: Refers to any damage to cells, tissue or an organ resulting from an autoimmune response.

β-hairpin conformation: A structural conformation of a peptide or protein. The β-hairpin conformation includes two β-strands linked by a β-turn to form a "hairpin"-like shape. The structure is amphiphilic; thus, one face of the hairpin is primarily hydrophobic, and the other is primarily hydrophilic. A limited number of the side chains of hydrophobic amino acids can exist on the hydrophilic face of the hairpin and vice versa, but not so many as to change the overall amphiphilicity of the folded structure. A non-limiting example of a peptide that can fold into an β-hairpin conformation is provided herein as MAX8.

Cationic amphiphilic peptide: A peptide that has a positive electrostatic charge at neutral pH and folds into a β-hairpin conformation under suitable conditions, such as when dissolved at 2.0% w/v in 50 mM Bis Tris Propane, pH 7.4, 150 mM NaCl, at 25° C. When folded into the β-hairpin conformation, one face of the hairpin is primarily hydrophobic, and the other is primarily hydrophilic. A non-limiting example of an amphiphilic cationic β-hairpin peptide is provided herein as the MAX8 peptide.

Crystallization: The process of arranging atoms or molecules that are in a fluid or solution state into a highly ordered solid structure, known as a crystal. A "crystallized" molecule is one exhibiting short and long range order of atoms in a fixed lattice arrangement.

Cytotoxic T-lymphocyte-associated protein 4 (CTLA4)-Ig: An immunosuppressive drug commonly used to treat autoimmune diseases and prevent allograft rejection. CTLA4-Ig is a fusion protein comprised of the extracellular domain of CTLA4 and the Fc region of IgG1. Abatacept (marketed as Orencia®) is a CTLA4-Ig developed by Bristol-Meyers Squibb; it is typically used in the treat of autoimmune disease. Belatacept (marketed as Nulojix®) is a second generation CTLA4-Ig differing from Abatacept by two amino acids; it is generally used to promote graft and transplant survival.

Disperse: Distributed throughout a medium, such as a disclosed peptide hydrogel. In particular examples, crystals of a small molecule drug are dispersed in a peptide hydrogel and are distributed evenly throughout the peptide hydrogel. However, dispersal of the crystals of the small molecule drug in a peptide hydrogel does not require absolute even distribution.

Effective amount: An amount of an agent (such as an immunosuppressive drug) that is sufficient to produce a desired response, such as reducing or inhibiting one or more signs or symptoms associated with a condition or disease. In some examples, an "effective amount" is an amount that inhibits or prevents allograft rejection. In some examples, an "effective amount" is a therapeutically effective amount in which the agent alone or with one or more additional therapies, induces the desired response, such as an increase in survival, such as an increase in survival of 3 months, 6 months, 12 months, two years, or five years or longer.

Immunosuppressive drug: An agent that inhibits one or more activities of the immune system. Immunosuppressive drugs can be, for example, small molecules. Immunosuppressive small molecule drugs include, but are not limited to, tofacitinib, dox, barbital, nadolol, ephidrine, procainamide, codeine, triamterene, cortison, phenobarbital, morin, clonidine, hydrocortisone, trovalfloxacin, moxifloxacin, zolpidem, tolcapone, and benoxaprofen. CTLA4-Ig is another example of an immunosuppressive drug.

Partition coefficient: The ratio of the concentrations of a compound in a mixture of two immiscible phases at equilibrium. For example, the partition coefficient is used to measure the concentration of a solute in two different solvents, such as in water and a non-polar solvent. "LogP" refers to the logarithm of the partition coefficient "P". LogP can be used as a measure of the solubility of a drug, such as a small molecule drug.

Peptide: A chain of amino acids, typically less than 75 amino acids in length, such as 20-50 amino acids in length. The residues in a peptide can include post-translational or secondary modifications, such as glycosylation, sulfation or phosphorylation, as well as chemical modifications. "Peptide" applies to naturally occurring amino acid polymers and non-naturally occurring amino acid polymers, including amino acid polymers in which one or more amino acid residues are non-natural amino acids. A "residue" refers to an amino acid or amino acid mimetic incorporated in a peptide by an amide bond or amide bond mimetic. A peptide has an amino terminal (N-terminal) end and a carboxy terminal (C-terminal) end. Typically, the amino acids making up a peptide are numbered in order, starting at the amino terminus and increasing in the direction toward the carboxy terminus of the peptide. Thus, when one amino acid is said to "follow" another, that amino acid is positioned closer to the carboxy terminal end of the peptide than the preceding amino acid.

Peptide hydrogel: A colloid gel including an internal phase and a dispersion medium, in which an aqueous solution is the dispersion medium and a self-assembled network of peptides is the internal phase. The peptides in the hydrogel are self-assembled and are folded into an β-hairpin conformation in the fibrillar network that forms the internal phase of the hydrogel. The peptide hydrogels disclosed herein are made using peptides that form a β-hairpin conformation in an aqueous solution comprising 150 mM NaCl and a pH of 7.4 at 25-37° C. Thus, an aqueous solution containing 2% w/v of a disclosed peptide and 150 mM NaCl and a pH of 7.4 forms a peptide hydrogel comprising a fibrillar network of the peptide when incubated at 25-37° C. in a container. Peptide hydrogels include a sufficient elastic modulus or stiffness that allows them to maintain shape. In several embodiments, the peptide hydrogel has an elastic modulus of 40 Pascal or greater. Peptide hydrogels formed from the disclosed self-assembled peptides in an β-hairpin conformation can be characterized by shear-thin/recovery rheological properties. The hydrogel undergoes a gel-sol phase transition upon application of shear stress, and a sol-gel phase transition upon removal of the shear stress. Thus, application of shear stress converts the solid-like gel into a viscous gel capable of flow, and cessation of the shear results in gel recovery. General information concerning peptide hydrogels having shear-thin/recovery rheological properties and methods of making same is provided, for example, in Sathaye, et al. *Biomacromolecules,* 2014, 15 (11): 3891-3900; Hule et al., 2008, Faraday Discuss, 139: 251-420. In several embodiments, the peptide hydrogel can be a sterile hydrogel prepared with physiological and non-toxic dispersion medium for use to deliver therapeutics to a subject.

Pharmaceutically acceptable carriers: The pharmaceutically acceptable carriers of use are conventional. *Remington's Pharmaceutical Sciences,* by E. W. Martin, Mack Publishing Co., Easton, PA, 15th Edition, 1975, describes compositions and formulations suitable for pharmaceutical delivery of the peptide hydrogels herein disclosed.

Pharmaceutically acceptable salt: A biologically compatible salt of a compound that can be used as a drug, which salts are derived from a variety of organic and inorganic counter ions well known in the art and include, by way of example only, sodium, potassium, calcium, magnesium, ammonium, tetraalkylammonium, and the like; and when the molecule contains a basic functionality, salts of organic or inorganic acids, such as hydrochloride, hydrobromide, tartrate, mesylate, acetate, maleate, oxalate, and the like. Pharmaceutically acceptable acid addition salts are those salts that retain the biological effectiveness of the free bases while formed by acid partners that are not biologically or otherwise undesirable, e.g., inorganic acids such as hydrochloric acid, hydrobromic acid, sulfuric acid, nitric acid, phosphoric acid, and the like, as well as organic acids such as acetic acid, trifluoroacetic acid, propionic acid, glycolic acid, pyruvic acid, oxalic acid, maleic acid, malonic acid, succinic acid, fumaric acid, tartaric acid, citric acid, benzoic acid, benzene sulfonic acid (besylate), cinnamic acid, mandelic acid, methanesulfonic acid, ethanesulfonic acid, p-toluenesulfonic acid, salicylic acid and the like. Pharmaceutically acceptable base addition salts include those derived from inorganic bases such as sodium, potassium, lithium, ammonium, calcium, magnesium, iron, zinc, copper, manganese, aluminum salts and the like. Exemplary salts are the ammonium, potassium, sodium, calcium, and magnesium salts. Salts derived from pharmaceutically acceptable organic non-toxic bases include, but are not limited to, salts of primary, secondary, and tertiary amines, substituted amines including naturally occurring substituted amines, cyclic amines and basic ion exchange resins, such as isopropylamine, trimethylamine, diethylamine, triethylamine, tripropylamine, ethanolamine, 2-dimethylaminoethanol, 2-diethylaminoethanol, dicyclohexylamine, lysine, arginine, histidine, caffeine, procaine, hydrabamine, choline, betaine, ethylenediamine, glucosamine, methylglucamine, theobromine, purines, piperazine, piperidine, N-ethylpiperidine, polyamine resins, and the like. Exemplary organic bases are isopropylamine, diethylamine, ethanolamine, trimethylamine, dicyclohexylamine, choline, and caffeine.

Polypeptide and peptide modifications: The present disclosure includes synthetic peptides, as well as derivatives (chemically functionalized polypeptide molecules obtained starting with the disclosed polypeptide sequences) and variants (homologs) of peptides described herein. The peptides disclosed herein include a sequence of amino acids that can include L- and/or D-amino acids, naturally occurring and otherwise.

Peptides can be modified by a variety of chemical techniques to produce derivatives having essentially the same activity as the unmodified polypeptides, and optionally having other desirable properties. For example, carboxylic acid groups of the protein, whether carboxyl-terminal or side chain, may be provided in the form of a salt of a pharmaceutically-acceptable cation or esterified to form a $C_1$-$C_{16}$ ester, or converted to an amide of formula $NR_1R_2$ wherein $R_1$ and $R_2$ are each independently H or $C_1$-$C_{16}$ alkyl, or combined to form a heterocyclic ring, such as a 5- or 6-membered ring. Amino groups of the polypeptide, whether amino-terminal or side chain, may be in the form of a pharmaceutically-acceptable acid addition salt, such as the HCl, HBr, acetic, benzoic, toluene sulfonic, maleic, tartaric and other organic salts, or may be modified to $C_1$-$C_{16}$ alkyl or dialkyl amino or further converted to an amide.

Hydroxyl groups of the polypeptide side chains can be converted to $C_1$-$C_{16}$ alkoxy or to a $C_1$-$C_{16}$ ester using well-recognized techniques. Phenyl and phenolic rings of the polypeptide side chains can be substituted with one or more halogen atoms, such as F, Cl, Br or I, or with $C_1$-$C_{16}$ alkyl, $C_1$-$C_{16}$ alkoxy, carboxylic acids and esters thereof, or amides of such carboxylic acids. Methylene groups of the polypeptide side chains can be extended to homologous $C_2$-$C_4$ alkylenes. Thiols can be protected with any one of a number of well-recognized protecting groups, such as acetamide groups. Those skilled in the art will also recognize methods for introducing cyclic structures into the polypeptides of this disclosure to select and provide conformational constraints to the structure that result in enhanced stability. For example, a C- or N-terminal cysteine can be added to the polypeptide, so that when oxidized the polypeptide will contain a disulfide bond, generating a cyclic polypeptide. Other polypeptide cyclizing methods include the formation of thioethers and carboxyl- and amino-terminal amides and esters.

In particular non-limiting examples, the peptide is acetylated at the N-terminus and/or is amidated at the C-terminus.

Small molecule: A low-molecular weight compound that is capable of modulating, to some measurable extent, an activity of a target molecule. Small molecules generally have a molecular weight less than about 2000 Daltons, or less than about 1000 Daltons. In some embodiments herein, the small molecule is between about 200 Daltons and about 2000 Daltons and/or has a logP range of about −4 to about 4. In specific non-limiting examples, the small molecule is tofacitinib, or a pharmaceutically acceptable salt or derivative thereof.

Subject: Living multi-cellular vertebrate organisms, a category that includes human and non-human mammals. In one example, the subject is a human.

Synthetic: Produced by artificial means in a laboratory, for example a synthetic peptide can be chemically synthesized in a laboratory.

Therapeutically effective amount: A quantity of a specified agent (such as a peptide hydrogel) sufficient to achieve a desired effect in a subject, cell or culture being treated with that agent. In some embodiments, the therapeutically effective amount is the amount of a tofacitinib hydrogel necessary to promote survival of a subject with an organ transplant.

Tofacitinib: A small molecule inhibitor of janus kinase 1 (JAK1) and JAK3. Tofacitinib is a small molecule immunosuppressive drug that is commonly used for the treatment of autoimmune diseases, such as rheumatoid arthritis and inflammatory bowel disease, and to prevent organ transplant rejection. Tofacitinib, pharmaceutically acceptable salts and derivatives thereof are known (see, for example, PCT Publication Nos. WO 01/42246, WO 01/42246, WO 03/048162, WO 2012/135338, WO 2012/137111, and WO 2013/090490; and U.S. Pat. Nos. 9,260,438 and 9,670,160, which are herein incorporated by reference in their entirety). The chemical name for tofacitinib is 3-((3R,4R)-4-methyl-3-(methyl (7H-pyrrolo[2,3-d]pyrimidin-4-yl)amino) piperidin-1-yl)-3-oxopropanenitrile. The chemical structure of tofacitinib is provided as Compound (1):

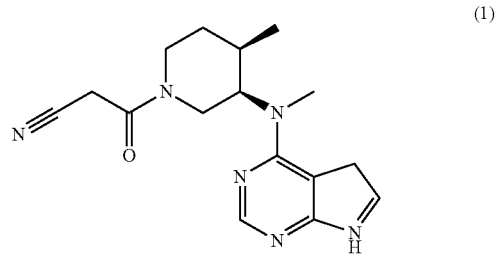 [SMILES: C[C@@H]1CCN(C(=O)CC#N)C[C@@H]1N(C)c1ncnc2c1CC=N2]

Treating, preventing or ameliorating a disease: "Preventing" a disease refers to inhibiting the full development of a disease, for example in a person who is known to have a predisposition to a disease such an autoimmune disease. "Treating" refers to a therapeutic intervention that ameliorates a sign or symptom of a disease or pathological condition after it has begun to develop. "Ameliorating" refers to the reduction in the number or severity of signs or symptoms of a disease, such as an autoimmune disease.

II. Overview of Several Embodiments

Disclosed herein are compositions that allow for the local delivery and sustained release of an immunosuppressive small molecule drug. The compositions include a peptide hydrogel, containing the immunosuppressive small molecule drug in crystalline form. Crystallization of the small molecule within the fibril network of the hydrogel allows for slow release of the drug at the site of administration. Local delivery of the drug minimizes drug-associated toxicity that can occur following systemic administration. Administration locally also permits use of a lower dose of the drug relative to systemic delivery.

Provided herein is a composition that includes a cationic amphiphilic peptide hydrogel and a crystallized immunosuppressive small molecule drug dispersed within the peptide hydrogel. In some embodiments, the amino acid sequence of the peptide comprises or consists of the amino acid sequence set forth as: $(XZ)_nX$-[$^D$PP, $^D$PG, or NG]-X $(ZX)_n$ (SEQ ID NOs: 3-29), wherein each X is individually selected from V, I, L, M, T, F, W, and Y; each Z is individually selected from any amino acid; n is from 3 to 5; and the peptide has a net positive charge at neutral pH. In some examples, the peptide has a net positive charge of from +3 to +8 (such as +3, +4, +5, +6, +7, or +8) at neutral pH.

In some examples, the amino acid sequence of the peptide comprises or consists of the amino acid sequence set forth as: $(XZ)_nX^DPPX(ZX)_n$ (SEQ ID NOs: 3-11); $(XZ)_nX^DPGX(ZX)_n$ (SEQ ID NOs: 12-20); or $(XZ)_nXNGX(ZX)_n$ (SEQ ID NOs: 21-29); wherein each X is individually selected from F, I, L, M, T, V, W, and Y; each Z is individually selected from any amino acid; and n is from 3 to 5. In some examples, the peptide has a net positive charge of from +3 to +9 (such as +3, +4, +5, +6, +7, +8, or +9) at neutral pH. In particular non-limiting examples, the amino acid sequence of the peptide comprises or consists of the amino acid sequence

```
                    (MAX8; SEQ ID NO: 33)
VKVKVKVKV^DPPTKVEVKVKV, (HLT2; SEQ ID NO: 30)
VLTKVKTKV^DPPTKVEVKVLV
or (MAX 1; SEQ ID NO: 31)
VKVKVKVKV^DPPTKVKVKVKV.
```

Crystallization of the immunosuppressive small molecule drug within the peptide hydrogel can be evaluated using any suitable means known to one of skill in the art. For example, the formation of crystals in the hydrogel can be detected visually, such as by microscopy, for example phase-contrast microscopy or confocal microscopy (see Example 1). The crystallization state of the immunosuppressive small molecule can also be evaluated functionally, such as by determining the release profile of the drug from the hydrogel. If the small molecule has formed crystals in the hydrogel, the drug will exhibit a slower, more sustained release profile relative to the drug in a soluble form in the hydrogel.

In some embodiments, the peptide is acetylated at the N-terminus, and/or the peptide is amidated at the C-terminus.

In some embodiments, the immunosuppressive small molecule drug has a molecular weight of about 200 to about 2000 Da, such as about 250 to about 1500 Da, about 500 to about 1000 Da, about 200 to about 1500 Da, about 200 to about 1000 Da, about 250 to about 2000 Da, or about 500 Da to about 2000 Da.

In some embodiments, the immunosuppressive small molecule drug has a logP range of about −4 to about 4, such as about −3 to about 3, about −2 to about 2 or about −1 to about 1. In specific examples, the immunosuppressive small molecule drug has a logP of about −4, −3, −2, −1, 0, 1, 2, 3 or 4.

In some examples, the immunosuppressive small molecule drug has a molecular weight of about 200 to about 2000 Da and logP of about −4 to about 4.

In particular examples, the immunosuppressive small molecule drug is tofacitinib, dox, barbital, nadolol, ephidrine, procainamide, codeine, triamterene, cortison, phenobarbital, morin, clonidine, hydrocortisone, trovalfloxacin, moxifloxacin, zolpidem, tolcapone, or benoxaprofen. In specific non-limiting examples, the immunosuppressive small molecule drug is tofacitinib, or a pharmaceutically acceptable salt or derivative thereof.

In some embodiments, the composition includes a concentration of immunosuppressive small molecule drug in the hydrogel of greater than 3.2 mM, such as greater than 5.0 mM, greater than 7.5 mM, greater than 10 mM, or greater than 15 mM. In some embodiments, the concentration of small molecule drug is about 5 mM to about 1 M, such as about 10 mM to about 1 M, about 20 mM to about 500 mM, or about 40 mM to about 250 mM. In some examples, the composition includes about 5 mM to about 1 M, such as about 10 mM to about 1 M, about 20 mM to about 500 mM, or about 40 mM to about 250 mM of tofacitinib.

In some embodiments, the immunosuppressive small molecule drug crystals are about 1 to about 1000 μm in diameter, such as about 10 to about 750 μm, or about 50 to about 500 μm, or about 100 to about 250 μm in diameter. In some examples, the crystals are about 1, about 10, about 25, about 50, about 75, about 100, about 200, about 250, about 500, about 750 or about 1000 μm diameter.

In some embodiments, the hydrogel comprises about 2% to about 30% DMSO, such as about 2%, about 5%, about 10%, about 15%, about 20%, about 25% or about 30% DMSO.

In some embodiments, the composition further includes a pharmaceutically acceptance carrier.

Also provided is a syringe that includes a composition disclosed herein.

Further provided is a method of inhibiting allograft rejection in a subject who has received an organ or tissue allograft. In some embodiments, the method includes administering a composition disclosed herein to the site of the allograft in the subject, such as by injection using a syringe loaded with the hydrogel. For example, the peptide hydrogel composition can be injected adjacent to or surrounding the tissue or organ allograft. In some examples, the organ is a heart, lung, liver, kidney, pancreas, or intestine. In some examples, the tissue is skin, bone, ligament, tendon, or cornea.

A method of treating autoimmune injury of an organ in a subject suffering from an autoimmune disease is also provided. In some embodiments, the method includes administering a composition disclosed herein to the organ of the subject, such as by injection using a syringe loaded with the hydrogel. For example, the peptide hydrogel composition can be injected adjacent to or surrounding the affected organ. In some examples, the autoimmune disorder is type 1 diabetes, an inflammatory bowel disease, Sjögren's syndrome, or Hashimoto's thyroiditis. In particular examples, the inflammatory bowel disease is Crohn's disease or ulcerative colitis.

In some embodiments of the methods disclosed herein, the subject is further administered a second immunosuppressive drug or therapy. The second drug can be administered locally or systemically.

An appropriate immunosuppressive agent or agents can be selected by a skilled practitioner based on several factors, including the type of organ or tissue allograft (or the type of autoimmune disorder), the organs and tissues effected, and the general health of the subject. Examples of additional immunosuppressive medications that can be administered to the subject include, but are not limited to, rabbit antithymocyte globulin (rATG) basiliximab, alemtuzumab, muromonab-CD3 (OKT3), azathioprine, glucocorticoids, cyclosporine, tacrolimus, mycophenolate mofetil, mycophenolic acid, sirolimus, everolimus, belatacept, leflunomide, bortezomib, eculizumab, rituximab and intravenous immune globulins. In some examples, the subject is further administered CTLA4-Ig (such as Abatacept or Belatacept).

Further provided is a method of producing a crystallized immunosuppressive small molecule drug dispersed within a cationic amphiphilic peptide hydrogel. In some embodiments, the method includes preparing an aqueous solution of a cationic amphiphilic peptide; preparing an immunosuppressive small molecule drug free base solution comprising the drug in DMSO; preparing an immunosuppressive small molecule drug stock solution by adding the free base solution to HEPES-buffered saline; and mixing the immunosuppressive small molecule drug stock solution with the aqueous solution of the cationic amphiphilic peptide under conditions sufficient to form a peptide hydrogel. In some examples, the amino acid sequence of the peptide comprises or consists of $(XZ)_n X-[^DPP, \, ^DPG, \text{ or } NG]-X(ZX)_n$ (SEQ ID NOs: 3-29), wherein each X is individually selected from V, I, L, M, T, F, W, and Y; each Z is individually selected from any amino acid; n is from 3 to 5; and the peptide has a net positive charge at neutral pH. In some examples, the peptide comprises or consists of the amino acid sequence set forth as $(XZ)_n \, X^DPPX(ZX)_n$ (SEQ ID NOs: 3-11), $(XZ)_n X^DPGX(ZX)_n$ (SEQ ID NOs: 12-20), or $(XZ)_n \, XNGX(ZX)_n$ (SEQ ID NOs: 21-29), wherein each X is individually selected from V, I, L, M, T, F, W, and Y; each Z is individually selected from any amino acid; and n is from 3 to 5. In specific non-limiting examples, the amino acid sequence of the peptide comprises or consists of VKVKVKVKV$^D$PPTKVEVKVKV (SEQ ID NO: 33), VLTKVKTKV$^D$PPTKVEVKVLV (SEQ ID NO: 30) or VKVKVKVKV$^D$PPTKVKVKVKV (SEQ ID NO: 31). In some examples, the immunosuppressive small molecule drug is tofacitinib, or a pharmaceutically acceptable salt or derivative thereof.

Also provided is a composition comprising a crystallized immunosuppressive small molecule drug dispersed within a cationic amphiphilic peptide hydrogel produced by a method that includes the steps of preparing an aqueous solution of a cationic amphiphilic peptide; preparing an immunosuppressive small molecule drug free base solution comprising the drug in DMSO; preparing an immunosuppressive small molecule drug stock solution by adding the free base solution to HEPES-buffered saline; and mixing the immunosuppressive small molecule drug stock solution with the aqueous solution of peptide under conditions sufficient to form a peptide hydrogel. In some examples, the amino acid sequence of the peptide comprises or consists of $(XZ)_n X-[^DPP, \, ^DPG, \text{ or } NG]-X(ZX)_n$ (SEQ ID NOs: 3-29), wherein each X is individually selected from V, I, L, M, T, F, W, and Y; each Z is individually selected from any amino acid; n is from 3 to 5; and the peptide has a net positive charge at neutral pH. In some examples, the peptide comprises or consists of the amino acid sequence set forth as $(XZ)_n$ XPPPX(ZX)$_n$ (SEQ ID NOs: 3-11), $(XZ)_n \, X^DPGX(ZX)_n$ (SEQ ID NOs: 12-20), or $(XZ)_n XNGX(ZX)_n$ (SEQ ID NOs: 21-29), wherein each X is individually selected from V, I, L, M, T, F, W, and Y; each Z is individually selected from any amino acid; and n is from 3 to 5. In specific non-limiting examples, the amino acid sequence of the peptide comprises or consists of VKVKVKVKV$^D$PPTKVEVKVKV (SEQ ID NO: 33), VLTKVKTKV$^D$PPTKVEVKVLV (SEQ ID NO: 30) or VKVKVKVKV$^D$PPTKVKVKVKV (SEQ ID NO: 31). In some examples, the immunosuppressive small molecule drug is tofacitinib, or a pharmaceutically acceptable salt or derivative thereof.

III. Peptide Hydrogel

The peptide hydrogel is formed from a fibrillar network of an amphiphilic cationic peptide that is in a β-hairpin conformation. The B-strand regions of the hairpin contain alternating sequences of hydrophobic (e.g., valine) and hydrophilic (charged) residues (e.g., lysine) such that in the folded state, one face (e.g., the valine-rich face) of the peptide is hydrophobic and the opposing face (e.g., the lysine rich face) is lined with positively charged side chains and is hydrophilic. This amphiphilic arrangement facilitates inter-molecular peptide interactions, and the fibril arrangement necessary for hydrogel formation.

Self-assembly is facilitated facially by hydrophobic association of the hydrophobic faces of folded hairpins and laterally via H-bond formation and hydrophobic van der Waals contacts between neighboring hairpins. Detailed knowledge of these parameters allows control of the self-assembly process and thus the ultimate hydrogel material properties. For example, under folding conditions peptides may adopt a desired secondary structure (e.g., may adopt an amphiphilic β-hairpin structure where one face of each B-strand in the hairpin is lined with hydrophobic residues and the other face is lined with hydrophilic residues). For example, intramolecular folding is dictated by the alleviation of charge density on the hydrophilic face upon folding, the formation of intramolecular hydrophobic van der Waals interactions, the formation of intramolecular hydrogen bonds between β-strands within the hairpin, and the turn propensity of the β-turn sequence included in the peptide.

Thus, peptides for use in the hydrogel of the compositions disclosed herein can be constructed to have desired characteristics by varying one or more of at least the following parameters: 1) electrostatics, for example, by varying the charge within the peptide intramolecular folding and self-assembly rates can be varied; 2) van der Waals interactions, for example, constructing peptides having varying a) lateral and facial intermolecular hydrophobic interactions and/or b) intramolecular hydrophobic interactions, allowing variation in the folding and self-assembly of the peptides as well as the material properties of the hydrogel; 3) hydrogen bonding, for example peptides may be constructed with varying a) intramolecular and/or b) intermolecular hydrogen bond formation to vary the folding, self-assembly and final material properties; and 4) turn sequence, for example, the turn region of peptides of the invention may be designed to control folding and thus trigger self-assembly.

In several embodiments, the peptide includes high β-sheet propensity residues flanking an intermittent four residue turn sequence. Polar and apolar residues may be arranged sequentially in the strand regions to afford amphiphilic surfaces when the peptide is folded in a β-hairpin conformation. For the four residue turn sequence, the peptide typically includes four residues (termed i, i+1, i+2, and i+3) that form a type II' β-turn. In the disclosed MAX8 peptide, these four residues are V$^D$PPT (SEQ ID NO: 34), and the type II' β-turn is defined by the dihedral angles (Phi and Psi) adopted by the $^D$PP portion of the turn sequence, where 'D' denotes D-stereochemistry of the first proline residue. The preferred phi and psi dihedral angles (degrees) that define a type II' turn are: residue i+1 (60, −120); residue i+2 (−80,0). However, these values can vary by +/−20 degrees and the peptide can still form the appropriate β-turn structure.

In one particular embodiment, MAX8, a 20-residue peptide is composed of high β-sheet propensity valine and lysine residues flanking an intermittent tetrapeptide-V$^D$PPT-(SEQ ID NO: 34) designed to adopt type-II' β-turn structure. In addition to incorporating local design elements to stabilize hairpin structure, nonlocal effects were also considered by arranging the polar and apolar residues flanking the β-turn in an alternating fashion to favor β-hairpin formation in the self-assembled state. In addition, a B-branched residue was placed at the i-position of the turn to enforce a trans prolyl amide bond geometry at the i+1 position. This design element ensures that under folding conditions, intramolecular folding of monomeric hairpins is favored prior to self-assembly. A cis prolyl bond, which is designed against, could result in the presentation of individual β-strands within each monomer in an extended conformation. Peptides capable of adopting both cis and trans conformers could undergo indiscriminant self-association of extended and correctly folded monomers and may be actively designed against.

In some embodiments, the amphiphilic cationic peptide comprises or consists of an amino acid sequence set forth as:

$$(XZ)_nX\text{-}[^DPP,^DPG, \text{ or } NG]\text{-}X(ZX)_n \text{(SEQ ID NOs:3-29)} \quad (1)$$

wherein each X is individually selected from any one of V, I, L, M, T, F, W, and Y; each Z is individually selected from any amino acid; n is from 3 to 5 (such as 3, 4, or 5); and the peptide has a net positive charge of from +3 to +9 (such as +3, +4, +5, +6, +7, +8, or +9) at neutral pH. The peptide folds into an β-hairpin conformation when dissolved at 2.0% w/v in 50 mM Bis Tris Propane, pH 7.4, 150 mM NaCl, at 25° C.

In some embodiments of peptide (1), the second amphiphilic cationic peptide comprises or consists of an amino acid sequence set forth as:

$$(XZ)_nX^DPPX(ZX)_n \text{ (SEQ ID NOs: 3-11)} \quad (1a)$$

wherein each X is individually selected from any one of F, I, L, M, T, V, W, and Y; each Z is individually selected from any amino acid; n is from 3 to 5 (such as 3, 4, or 5); and the peptide has a net positive charge of from +3 to +8 (such as +3, +4, +5, +6, +7, or +8) at neutral pH. The peptide folds into an β-hairpin conformation when dissolved at 2.0% w/v in 50 mM Bis Tris Propane, pH 7.4, 150 mM NaCl, at 25° C.

In some embodiments of peptide (1), the amphiphilic cationic peptide comprises or consists of an amino acid sequence set forth as:

$$(XZ)_nX^DPGX(ZX)_n \text{(SEQ ID NOs:12-20)} \quad (1b)$$

wherein each X is individually selected from any one of V, I, L, M, T, F, W, and Y; each Z is individually selected from any amino acid; n is from 3 to 5 (such as 3, 4, or 5); and the peptide has a net positive charge of from +3 to +9 (such as +3, +4, +5, +6, +7, +8 or +9) at neutral pH. The peptide folds into an β-hairpin conformation when dissolved at 2.0% w/v in 50 mM Bis Tris Propane, pH 7.4, 150 mM NaCl, at 25° C.

In some embodiments of peptide (1), the amphiphilic cationic peptide comprises or consists of an amino acid sequence set forth as:

(1c)
$$(XZ)_nXNGX(ZX)_n$$ (SEQ ID NOs: 21-29)

wherein each X is individually selected from any one of V, I, L, M, T, F, W, and Y; each Z is individually selected from any amino acid; n is from 3 to 5 (such as 3, 4, or 5); and the peptide has a net positive charge of from +3 to +9 (such as +3, +4, +5, +6, +7, +8, or +9) at neutral pH. The peptide folds into an β-hairpin conformation when dissolved at 2.0% w/v in 50 mM Bis Tris Propane, pH 7.4, 150 mM NaCl, at 25° C.

In some embodiments of peptide (1), the amphiphilic cationic peptide comprises or consists of an amino acid sequence set forth as:

(1d) (MAX8; SEQ ID NO: 33)
VKVKVKVKV$^D$PPTKVEVKVKV (1e) (HLT2; SEQ ID NO: 30)
VLTKVKTKV$^D$PPTKVEVKVLV (1f) (MAX1; SEQ ID NO: 31)
VKVKVKVKV$^D$PPTKVKVKVKV (1g) (; SEQ ID NO: 32)
VLTKVKTKV$^D$PGTKVEVKVLV (1h) (SEQ ID NO: 2)
VLTKVKTKVNGTKVEVKVLV

The peptide folds into a β-hairpin conformation when dissolved at 2.0% w/v in 50 mM Bis Tris Propane, pH 7.4, 150 mM NaCl, at 25° C.

In some embodiments, the N-terminus of the amphiphilic cationic peptide is acetylated. In some embodiments, the C-terminus of the amphiphilic cationic peptide is amidated.

The amphiphilic cationic peptide can fold into an β-hairpin conformation comprising a β-turn, two β-strands, a hydrophobic face, and a hydrophilic face under appropriate conditions (e.g., 2.0% w/v peptide in 50 mM Bis Tris Propane, pH 7.4, 150 mM NaCl, at 25° C.). Under the appropriate conditions, the amphiphilic cationic peptide self-assembles into a fibrillar network wherein the peptide is folded in a β-hairpin conformation in the fibrillar state.

The peptide hydrogel can readily be made by preparing an aqueous solution comprising one or more of the cationic amphiphilic peptides (such as MAX8) as disclosed herein and altering one or more characteristics of the solution, wherein a hydrogel is formed. The characteristic altered may be any characteristic that results in formation of a hydrogel upon its alteration. Suitable examples include, but are not limited to, ionic strength, temperature, concentration of a specific ion, and pH. In particular embodiments, the character altered may be the pH of the solution. The cationic amphiphilic peptide forms a hydrogel at a pH of about 7 or higher. Increasing pH and increasing ionic strength both encourage hydrogel formation, and the two effects are roughly additive. Thus, the lower the pH, the higher the salt concentration necessary for hydrogel formation. In some embodiments, the hydrogel can be formed in a container (such as a syringe), for example a closed container.

In some embodiments, altering one or more characteristics of the solution results in a salt concentration of from about 10 mM to about 400 mM, such as about 50 to about 300 mM, about 100 to about 200 mM, or about 150 mM. Any salt may be used, for example, KCl, NaCl, $MgCl_2$, KF, $MgSO_4$, etc. In one embodiment, the salt may be NaCl. In some embodiments, the solution may have a desired pH, for example, a pH of from about 7 to about 9, a pH of from about 7.5 to about 8.5, a pH of from about 7.0 to about 8.0, or a pH of about 7.4, which may stay the same or be changed upon formation of the hydrogel.

In one non-limiting example, the hydrogel is formed in 50 mM Bis Tris Propane (BTP), 150 mM NaCl, pH 7.4. Any buffer system can be used except phosphate based buffer systems, as phosphate buffers are known to precipitate β-hairpin peptides. Accordingly, peptide hydrogels including a cationic amphiphilic peptide can simply be formed by, for example, adding buffer of appropriate ionic strength to an aqueous solution of unfolded peptide; drawing the resulting solution into a syringe; and allowing it to gel at 25° C. directly in the syringe.

The peptide hydrogel is a well hydrated solid material and has a stiffness greater than 40 Pascal (Pa), as measured by the storage modulus G' at a strain of 0.2%. Above approximately 40 Pa the material is a self-supporting solid gel material. The stiffness can reach greater than 10,000 Pa at higher peptide concentration. The hydrogel typically contains at least 0.5 wt % of the amphiphilic cationic peptide in an aqueous medium. For example, the disclosed hydrogel may have varying amounts of the amphiphilic cationic peptide material. For example, the hydrogel may be formed comprising a percent by weight of the amphiphilic cationic peptide of from about 0.25% w/v to about 4.0% w/v, from about 0.25% w/v to about 3.0% w/v, from about 0.25% w/v to about 2.0% w/v, from about 0.25% w/v to about 1.0% w/v, from about 0.5% w/v to about 4.0% w/v, from about 0.5% w/v to about 3.0% w/v, from about 0.5% w/v to about 2.0% w/v, from about 0.5% w/v to about 1.0% w/v, from about 1.0% w/v to about 4.0% w/v, from about 1.0% w/v to about 3.0% w/v, from about 1.0% w/v to about 2.0% w/v, from about 2.0% w/v to about 4.0% w/v, or from about 2.0% w/v to about 3.0% w/v.

In one aspect, the amount by weight of the amphiphilic cationic peptide and the kinetics of gelation may be varied to produce a hydrogel having a desired modulus (stiffness). Hydrogels of the invention may have a modulus from about 40 Pascal (Pa) to about 50,000 Pa, from about 40 Pa to about 25,000 Pa, from about 40 Pa to about 10,000 Pa, from about 40 Pa to about 5,000 Pa, from about 40 Pa to about 1,000 Pa, from about 40 Pa to about 500 Pa, from about 40 Pa to about 100 Pa, from about 100 Pa to about 50,000 Pa, from about 100 Pa to about 25,000 Pa, from about 100 Pa to about 10,000 Pa, from about 100 Pa to about 5,000 Pa, from about 100 Pa to about 2,000 Pa, from about 100 Pa to about 1,000 Pa, from about 100 Pa to about 500 Pa, or from about 100 Pa to about 250 Pa.

The resultant hydrogel is mechanically rigid and displays shear-thinning/recovery behavior. This characteristic provides a free flowing suspension during the application of shear and complete reformation of the gel network (self-healing) after cessation of the shear. This combination of shear thinning and self-healing allows material formation in a spatially resolved manner. For example, in some embodiments, one of ordinary skill in the art can inject or spray (shear thin) a pre-formed hydrogel into a target location in a subject where it self-heals and reforms the hydrogel. The shear stress converts the gel to a lower viscosity, flowable fluid. The shear stress is relieved when the fluid exits the syringe or spray nozzle and the gel quickly self-heals, recovering its original mechanical rigidity. This shear-thinning/recovery mechanism allows the nanoparticle-hydrogel composite to be easily delivered by syringe or spray to the target location in the subject.

The amphiphilic cationic peptides for use in the disclosed embodiments can be peptides from about 20 to about 75 residues (e.g., from about 20 to about 50 residues, from about 20 to about 40 residues, from about 20 to about 30 residues, or from about 20 to about 25 residues, ("about" refers to plus or minus 2 residues). In some embodiments, the peptides for use in the disclosed embodiments can be from 20 to 75 residues (e.g., from 20 to 50 residues, from 20 to 40 residues, from 20 to 30 residues, or from 20 to 25 residues). In some embodiments, the peptide can be no more than 50 residues, such as no more than 30 residues or no more than 20 residues. In additional embodiments, the peptide can be 20, 25, 30, 35, 40, 45, or 50, residues in length. In some embodiments, the peptide can be 20 amino acids in length.

The amphiphilic cationic peptides for use in the disclosed embodiments can be synthesized using any appropriate technique, such as automated solid phase procedures. The amphiphilic cationic peptides may incorporate one or more modified amino acid residues (e.g., D-amino acids, homologs of naturally occurring amino acids, amino acids with modified side chains, etc.). Exemplary techniques and procedures for solid phase synthesis are described in *Solid Phase Peptide Synthesis: A Practical Approach*, by E. Atherton and R. C. Sheppard, published by IRL, Oxford University Press, 1989. Alternatively, peptides may be prepared by way of segment condensation, as described, for example, in Liu et al., *Tetrahedron Lett.* 37:933-936, 1996; Baca et al., *J. Am. Chem. Soc.* 117:1881-1887, 1995; Tam et al., *Int. J. Peptide Protein Res.* 45:209-216, 1995; Schnolzer and Kent, *Science* 256:221-225, 1992; Liu and Tam, *J. Am. Chem. Soc.* 116:4149-4153, 1994; Liu and Tam, *Proc. Natl. Acad. Sci. USA* 91:6584-6588, 1994; and Yamashiro and Li, *Int. J. Peptide Protein Res.* 31:322-334, 1988). Other methods useful for synthesizing the peptides of the disclosure are described in Nakagawa et al., *J. Am. Chem. Soc.* 107:7087-7092, 1985.

Additional exemplary techniques for peptide synthesis are taught by Bodanszky, M. and Bodanszky, A., *The Practice of Peptide Synthesis*, Springer Verlag, New York, 1994; and by Jones, J., *Amino Acid and Peptide Synthesis*, 2nd ed., Oxford University Press, 2002. The Bodanszky and Jones references detail the parameters and techniques for activating and coupling amino acids and amino acid derivatives. Moreover, the references teach how to select, use and remove various useful functional and protecting groups. Peptides of the disclosure can also be readily purchased from commercial suppliers of synthetic peptides once the supplier is provided with the sequence of the peptide. Such suppliers include, for example, Advanced ChemTech (Louisville, KY), Applied Biosystems (Foster City, CA), Anaspec (San Jose, CA), and Cell Essentials (Boston, MA).

Following synthesis, exemplary techniques for peptide purification include reverse phase chromatography, high performance liquid chromatography, ion exchange chromatography, size exclusion chromatography, affinity chromatography, and gel electrophoresis. The actual conditions used to purify a particular peptide, or a modified form thereof, will depend, in part, on synthesis strategy and on factors such as net charge, hydrophobicity, hydrophilicity, and the like.

The amphiphilic peptides disclosed herein are cationic. Accordingly, in typical embodiments involving a crystallized small molecule dispersed in the peptide hydrogel, the small molecule has a neutral or net positive charge to prevent binding of the drug to the hydrogel matrix. Depending on the drug, the neutral or net positive charge may lead to varying retention time in the peptide hydrogel.

Peptide hydrogels including an immunosuppressive small molecule can be readily produced by preparing an aqueous solution comprising the immunosuppressive small molecule (such as tofacitinib) and the amphiphilic β-hairpin peptide (such as MAX8) as disclosed herein and altering one or more characteristics of the solution, wherein a hydrogel is formed. As discussed above, the characteristic altered may be any characteristic that results in formation of a hydrogel upon its alteration, such as ionic strength, temperature, concentration of a specific ion, and pH. In some embodiments, the hydrogel including the small molecule can be formed in a container (such as a syringe), for example a closed container.

The immunosuppressive small molecule crystallized in the hydrogel can be any small molecule with immunosuppressive properties. In some embodiments, the immunosuppressive small molecule drug has a molecular weight of about 200 to about 2000 Da, such as about 250 to about 1500 Da, about 500 to about 1000 Da, about 200 to about 1500 Da, about 200 to about 1000 Da, about 250 to about 2000 Da, or about 500 Da to about 2000 Da. In some embodiments, the immunosuppressive small molecule drug has a logP range of about −4 to about 4, such as about −3 to about 3, about −2 to about 2 or about −1 to about 1. In specific examples, the immunosuppressive small molecule drug has a logP of about −4, −3, —2, −1, 0, 1, 2, 3 or 4. In some examples, the immunosuppressive small molecule drug has a molecular weight of about 200 to about 2000 Da and logP of about −4 to about 4.

In particular examples, the immunosuppressive small molecule drug is tofacitinib, dox, barbital, nadolol, ephidrine, procainamide, codeine, triamterene, cortison, phenobarbital, morin, clonidine, hydrocortisone, trovalfloxacin, moxifloxacin, zolpidem, tolcapone, or benoxaprofen.

In some embodiments, the peptide hydrogel contains about 10 mM to about 1 M of the immunosuppressive small molecule drug, such as about 20 mM to about 500 mM, or about 40 mM to about 250 mM. In some examples, the composition includes about 10 mM to about 1 M, such as about 20 mM to about 500 mM, or about 40 mM to about 250 mM of tofacitinib.

In some embodiments, the immunosuppressive small molecule drug crystals are about 1 to about 1000 µm in diameter, such as about 10 to about 750 µm, or about 50 to about 500 µm, or about 100 to about 250 µm in diameter. In some examples, the crystals are about 1, about 10, about 25, about 50, about 75, about 100, about 200, about 250, about 500, about 750 or about 1000 µm diameter.

In some embodiments, the peptide hydrogel comprises about 2% to about 30% DMSO, such as about 2%, about 5%, about 10%, about 15%, about 20%, about 25% or about 30% DMSO.

The peptide hydrogel including an immunosuppressive small molecule can be used for any suitable purpose, such as for inhibiting transplant rejection or treating autoimmune related injury of an organ stemming from an autoimmune disorder.

The following examples are provided to illustrate particular features of certain embodiments, but the scope of the claims should not be limited to those features exemplified.

EXAMPLES

Example 1: Tofacitinib-Loaded Hydrogel in a Heterotopic Heart Transplant

This example describes crystallization of tofacitinib in a peptide hydrogel and the ability of the tofacitinib hydrogel to promote survival in an animal model of organ transplant. Preparation of Tofacitinib-Loaded Hydrogel and Determination of Ex Vivo Drug Release A MAX8 peptide stock solution was prepared in glass vials by dissolving 1 mg of peptide in 50 µL of chilled sterile water. Tofacitinib free base and tofacitinib citrate (purchased from LC Laboratories, Woburn, MA) stock solutions were prepared in spectrophotometric grade DMSO with final concentrations of 100 µg/µL and 160 µg/µL, respectively. Concentration of the stock solution was determined in such a way that would maintain equal ratio of DMSO to HEPES buffered saline (HBS) (v/v) while loading equimolar concentration of tofacitinib free base and citrate into the hydrogel. Required volume of drug stock solution was added into a chilled solution of HBS (2X HBS, 50 mM HEPES, 300 mM NaCl, pH 7.4) to make the final volume as 50 µL. At this point, care was taken to avoid mixing before the peptide stock solution had been transferred to the resulting suspension. Peptide solution was added and samples were then mixed to initiate hydrogelation, resulting in a 1.0 wt % gel of a final total volume of 100 µL containing required amount of loaded drug. Tofacitinib free base was loaded to the final concentrations of 1.6, 3.2 and 16 mM. For tofacitinib citrate salt, only hydrogels with a final concentration of 16 mM loaded drug were considered for drug release studies. Samples were placed in an incubator at 37° C. for 24 hours. After 24 hours, 1 mL of 1X HBS (25 mM HEPES, 150 mM NaCl, pH 7.4) was added to the top of gel. At scheduled time points, the entire volume of buffer above the gel was removed and replaced with fresh buffer. Drug concentration was determined for each removed aliquot as a function of time by measuring absorbance at 290 nm in a UV-VIS spectrophotometer (Agilent 8453) with a standard curve constructed under similar conditions.

Figure 1A:
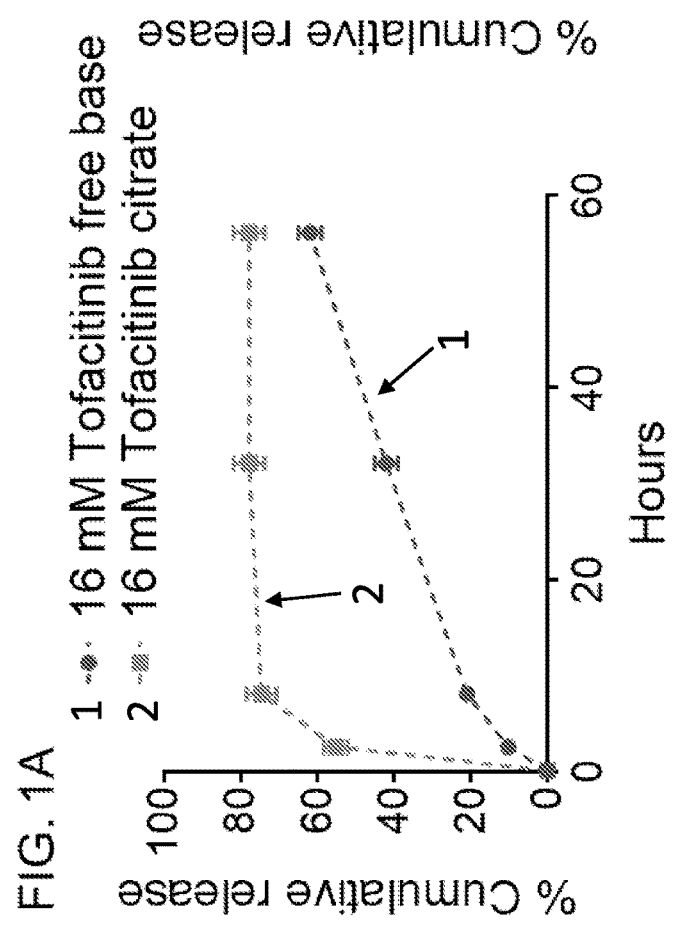
Figure 1D:
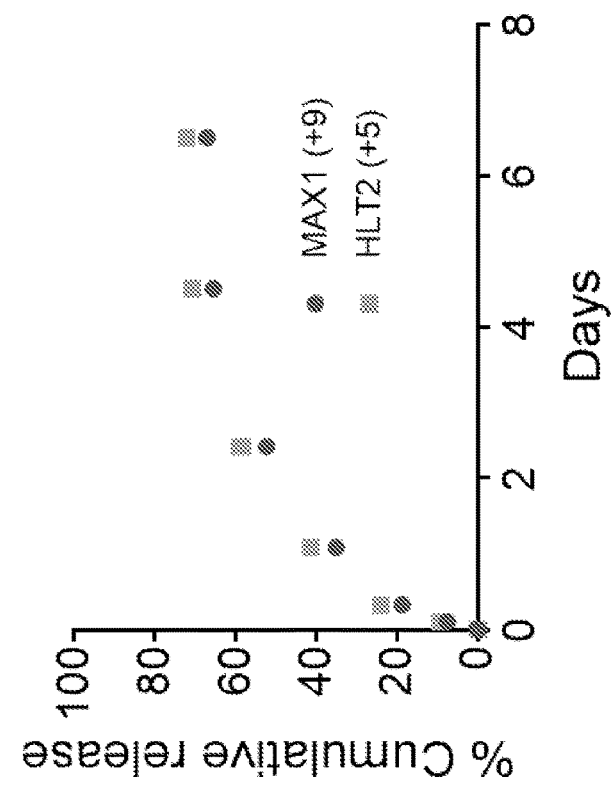
Figure 1C:
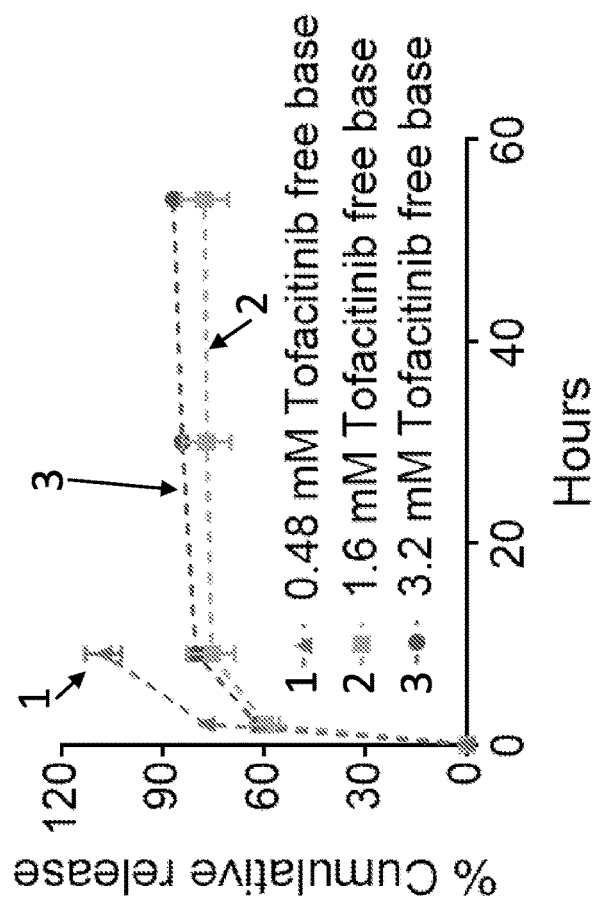

Results of the drug release studies are shown in FIGS. 1A-1D. A comparison of tofacitinib free base and tofacitinib citrate demonstrated that the free base form led to a slower, more sustained release of the drug (FIGS. 1A and 1B). FIG. 1C shows that there is variation in release profiles of tofacitinib free base based on the initial amount of drug loading. Lower concentrations of tofacitinib free base (0.48, 1.6 and 3.2 mM) led to a more rapid release of tofacitinib, compared to 16 mM tofacitinib (compare to FIG. 1A). Images of MAX8 hydrogels loaded with different concentrations of tofacitinib demonstrated that there was no visible indication of crystallization below a loading concentration of 16 mM.

Similar tofacitinib release profiles were observed from MAX1 and HLT2 hydrogels (FIG. 1D). Tofacitinib free base was encapsulated into two other positively charged hydrogels, MAX1 (+9 charge) and HLT2 (+5), at a loading concentration of 16 mM. Tofacitinib crystallized within these hydrogels in a similar manner as observed with MAX8 and displayed similar release profiles as was shown for MAX8.

Characterization of Tofacitinib-Loaded Hydrogel

During hydrogel-mediated encapsulation, when used at a loading concentration of 16 mM, tofacitinib free base initially produced an opaque suspension that turned into a transparent hydrogel as the drug dissolved in the self-assembled peptide matrix at 37° C. during the first 2-3 hours. Tofacitinib free base then gradually crystallized in situ over the next ~ 20 hours to form a hydrogel with islands of microcrystalline drug aggregates. Approximately 10 μL of the hydrogel was then placed on a glass slide and covered with a cover slip. Phase-contrast microscopy (EVOS FL Cell Imaging System) and confocal microscopy (LSM 710) were used to characterize the drug aggregates suspended in the hydrogel matrix. Crystallinity of the aggregates was verified from polarized light microscopy at low and high magnification.

Shown in FIGS. 2A-2C are phase contrast images of tofacitinib free base encapsulated within MAX8 peptide hydrogel at the drug concentrations of 16 mM (FIG. 2A), 1.6 mM (FIG. 2B) and blank MAX8 peptide hydrogel (FIG. 2C). Shown in FIGS. 2D-2E are confocal microscopy-generated differential interference contrast images of tofacitinib free base microcrystals dispersed in MAX8 peptide gel network at a drug concentration of 16 mM.

Crystallization of tofacitinib was significantly more efficient at 16 mM compared with the lower concentrations tested. Images of MAX8 hydrogels loaded with different concentrations of tofacitinib demonstrated that there was no visible indication of crystallization below a loading concentration of 16 mM. When the hydrogel was examined under a phase contrast microscope (FIG. 2B), no crystallized deposits were observed. This result indicates that tofacitinib needs to be at loading concentration above 3.2 mM for crystallization. However, it is believed that extremely high loading concentrations of tofacitinib (0.5-1 M) may lead to excessive super-saturation and amorphous precipitates may occur.

In contrast to tofacitinib free base, tofacitinib citrate did not crystallize within the MAX8 hydrogel even when loaded at 16 mM, but stayed in solution and released faster from the hydrogel matrix than the free base form (see FIGS. 1A and 1B for release profiles). Phase contrast images of tofacitinib citrate loaded in MAX8 gels showed no visible signs of crystallization.

MAX8 hydrogels loaded with tofacitinib free base at concentrations ranging from 0.48 to 3.2 mM resulted in soluble tofacitinib (not crystallized tofacitinib) within the gel matrix and displayed rapid tofacitinib release profiles with over 75% of the drug released within the first 10 hours (FIGS. 1A and 1B). MAX8 hydrogels with tofacitinib free base (16 mM) in a crystallized state took a period of 6 days to show similar cumulative release, indicating that crystallization of the drug plays a critical role in the prolonged release profile.

It is expected that any other small molecule drug exhibiting a solubility in a range similar to tofacitinib, as indicated by logP value, will achieve a super-saturated state leading to crystallization within the hydrogel and thereby demonstrate slower release profiles.

Dynamic Oscillatory Rheology

For rheological experiments with the drug-loaded hydrogel, 150 μL of a 2 wt % MAX8 peptide solution was first prepared by dissolving MAX8 in chilled sterile water. Required volume of tofacitinib stock solution in DMSO was added into a chilled solution of HEPES buffered saline (2X HBS, 50 mM HEPES, 300 mM NaCl, pH 7.4) to make the final volume as 150 μL. The peptide solution was then added to the tofacitinib suspension, mixed together and transferred quickly to the rheometer (AR G2, TA instruments) plate, which was pre-equilibrated at 5° C. The parallel plate tool was then lowered to a gap height of 0.5 mm and the temperature was increased linearly to 37° C. to initiate gelation. For the shear thinning and recovery experiment, a dynamic time sweep was first performed to measure the storage (G') modulus at a frequency of 6 rad/s and 0.2% strain as a function of time for 1 hour. This was immediately followed by the application of 1000% strain at a frequency of 6 rad/s for 30 seconds. To monitor the recovery ability of the sample after shear, another 1 hour dynamic time sweep (6 rad/s, 0.2% strain) was then applied to the sample. The results demonstrate that the drug-loaded hydrogels were able to fully recover following shear (FIG. 3).

Application of Tofacitinib-Loaded Hydrogel in Heterotopic Heart Transplant

Figure 4:
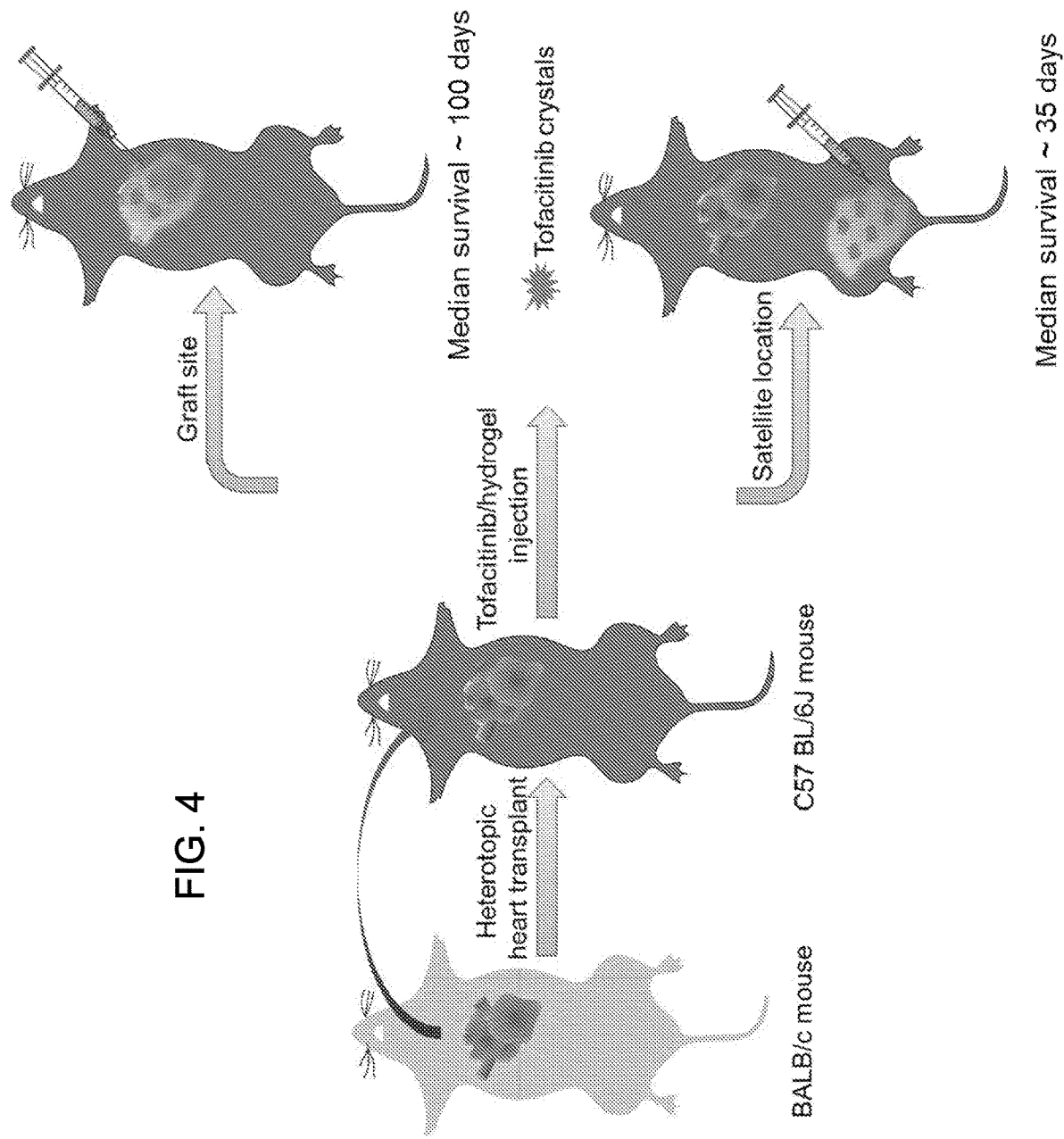
FIG. 4: Schematic elucidation of localized delivery of tofacitinib from a peptide hydrogel implant used in heterotopic heart transplant in mice. A C57 BL/6J mouse receives a transplanted heart from a BALB/c mouse. Tofacitinib crystals suspended in a hydrogel matrix are syringe delivered either locally surrounding the transplanted heart or distally at the base of the tail.

For animal experiments, MAX8 peptide was first decontaminated of any possible endotoxin by loading 5-6 mL of a 10 mg/mL peptide solution in sterile water to an endotoxin removal spin column (Pierce, Rockford, IL), and shaken for 2 hours at 4° C. The peptide was retrieved by centrifugation and repeated washing of the resin followed by lyophilization. Endotoxin levels were tested using a LAL chromogenic endotoxin quantification kit (Pierce, Rockford, IL). Endotoxin levels across different batches of the peptide were routinely found to be below detection level. Tofacitinib-loaded hydrogel was formed in a syringe using pure endotoxin-free MAX8 peptide. An equal volume of tofacitinib free base suspension in HBS was mixed thoroughly with an aqueous solution of a 2 wt % MAX8 peptide in a glass vial and the suspension was quickly drawn into a sterile 27-gauge syringe. 150 μL of the hydrogel loaded with total 750 μg of tofacitinib free base (16 mM loading concentration) was syringe-injected at the graft site or at the satellite location (base of the tail) in C57 BL/6J mice receiving transplanted heart from BALB/c mice (see FIG. 4 for a schematic). Specific groups of mice (with or without tofacitinib-hydrogel) received intraperitoneal administration of CTLA4-Ig on POD 0, 2, 4, and 6.

Figure 5:
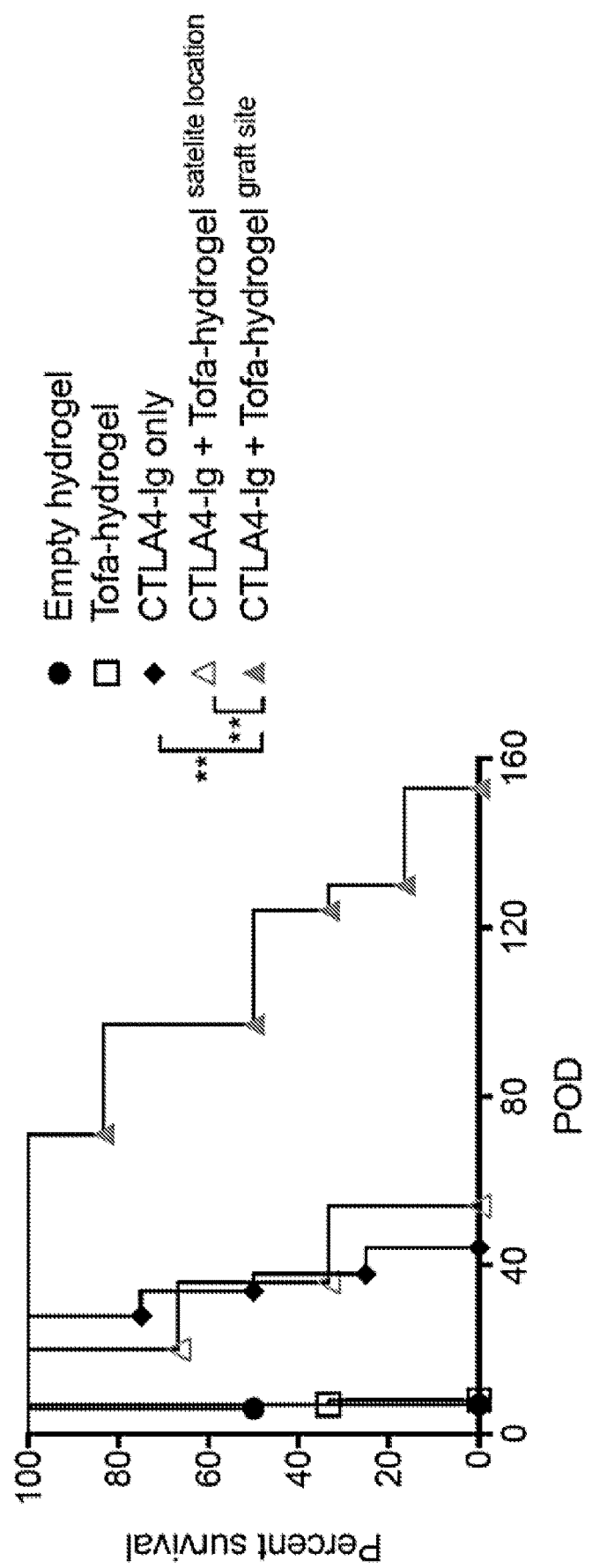
FIG. 5: Heterotopic heart transplantation with local and distal placement of hydrogel. Survival curves of C57BL/6J mice receiving BALB/c heart transplants under different treatment regimes. Mice were syringe-injected at the graft site or at the satellite location (at the base of the tail) with 150 µL of MAX8 hydrogel (16 mM loading concentration of tofacitinib free base) on post-operative day (POD) 0. CTLA4-Ig was i.p. administered on POD 0, 2, 4, and 6. n=3-4 for each group.

FIG. 5 shows survival curves of C57BL/6J mice receiving BALB/c heart transplants under different treatment regimes. Mice were syringe-injected at the graft site or at the satellite location with 150 μL of MAX8 hydrogel (16 mM loading concentration for tofacitinib free base) on POD 0. CTLA4-Ig was i.p. administered on POD 0, 2, 4, and 6. n=3-4 for each group.

These results demonstrate that local administration to the transplant site of a peptide hydrogel containing crystallized tofacitinib significantly improved survival of transplant recipient animals (average survival of greater than 100 days), compared to transplant recipient animals administered the same peptide hydrogel at a distal site (average survival of about 35 days).

Example 2: Release Profile of Tofacitinib Free Base from MAX8 Hydrogel

This example demonstrates that the release profile of tofacitinib free base from a cationic amphiphilic peptide hydrogel varies depending on the volume ratio of DMSO to hydrogel.

Figure 6A:
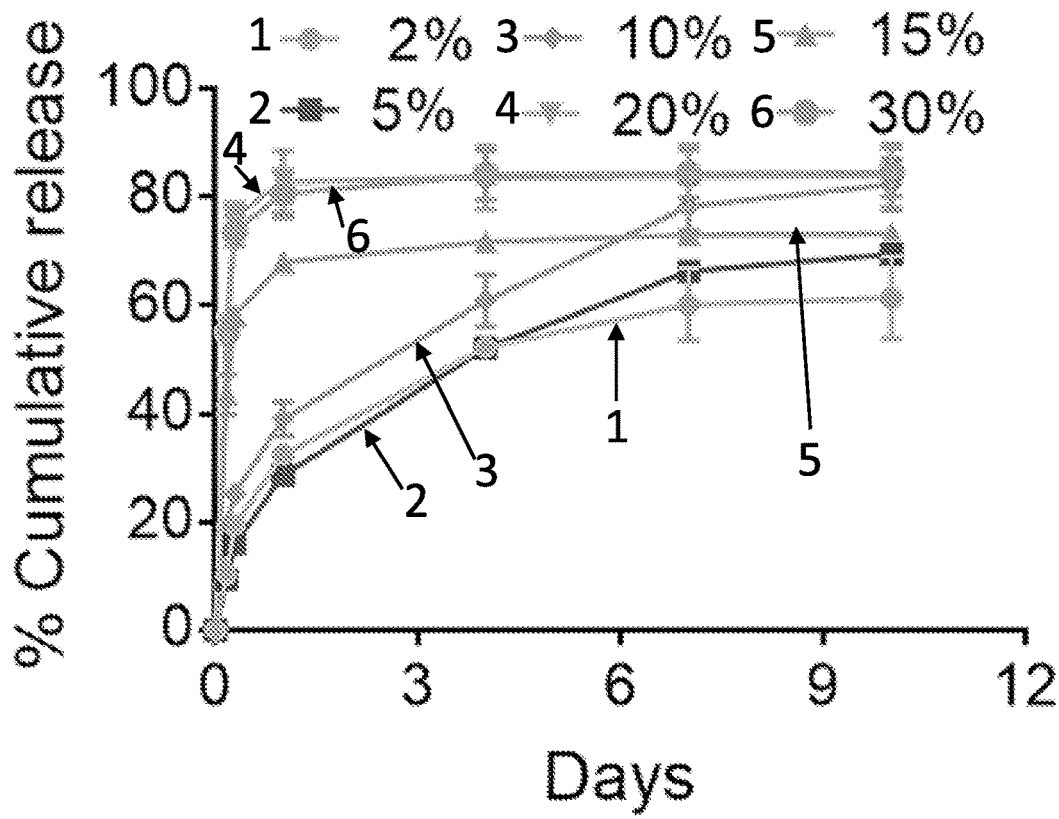
FIGS. 6A-6B: Release profile of tofacitinib from MAX8 hydrogel.
Figure 6B:
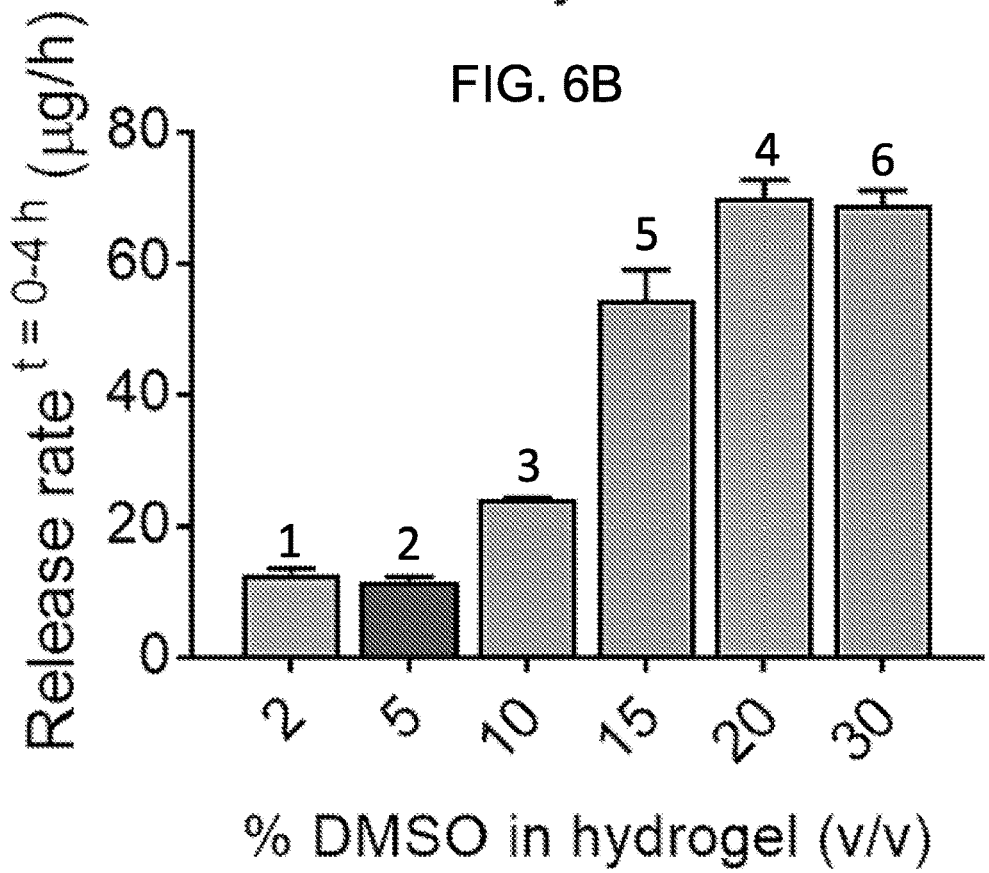

FIG. 6A shows the cumulative release profiles of tofacitinib (free base) from MAX8 hydrogel containing different volume ratios of DMSO versus hydrogel (2%, 5%, 10%, 15%, 20% or 30%). In each case, the tofacitinib stock solution was prepared in DMSO and an increasing volume of the DMSO stock was added while constituting the hydrogel. The total concentration of loaded tofacitinib was constant at 16 mM. The release profile of the drug was monitored from the hydrogel into buffer (25 mM HEPES, 150 mM NaCl, pH 7.4) at 37° C. FIG. 6B shows the release rate of tofacitinib from MAX8 hydrogel containing varying volumes of DMSO during the first 4 hours.

These results demonstrate that the release profile of tofacitinib from a cationic amphiphilic peptide hydrogel, such as MAX8, can be altered based on the level of DMSO in the stock solution. Specifically, decreasing the DMSO concentration reduces the solubility of tofacitinib and enhances its ability to form crystals.

It will be apparent that the precise details of the methods or compositions described may be varied or modified without departing from the spirit of the described embodiments. We claim all such modifications and variations that fall within the scope and spirit of the claims below.

---

The invention claimed is:

1. A composition comprising a cationic amphiphilic peptide hydrogel and microcrystals of tofacitinib dispersed within the cationic amphiphilic peptide hydrogel, wherein the amino acid sequence of the cationic amphiphilic peptide comprises or consists of VKVKVKVKV$^D$PPTKVEVKVKV (SEQ ID NO: 33), VLTKVKTKV$^D$PPTKVEVKVLV (SEQ ID NO: 30) or VKVKVKVKV$^D$PPTKVKVKVKV (SEQ ID NO: 31) and wherein the cationic amphiphilic peptide is acetylated at the N-terminus and amidated at the C-terminus, wherein the concentration of tofacitinib is greater than 3.2 mM and up to 250 mM.

2. A composition comprising a cationic amphiphilic peptide hydrogel and microcrystals of tofacitinib dispersed within the cationic amphiphilic peptide hydrogel, wherein the amino acid sequence of the cationic amphiphilic peptide comprises the amino acid sequence set forth as:

(XZ)$_n$X-[$^D$PP, $^D$PG, or NG]-X(ZX)$_n$ wherein each X is individually selected from V, I, L, M, T, F, W, and Y;

each Z is individually selected from any hydrophilic amino acid;

n is from 3 to 5; and the cationic amphiphilic peptide has a net positive charge at neutral pH, wherein the concentration of tofacitinib is greater than 3.2 mM and up to 250 mM.

3. The composition of claim 2, wherein the amino acid sequence of the cationic amphiphilic peptide comprises the amino acid sequence set forth as:

(XZ)$_n$X$^D$PPX(ZX)$_n$;

(XZ)$_n$X$^D$PGX(ZX)$_n$; or (XZ)$_n$XNGX(ZX)$_n$ (SEQ ID NO: 1);

and wherein each X is individually selected from V, I, L, M, T, F, W, and Y;

each Z is individually selected from K and E; and n is from 3 to 5.

4. The composition of claim 2, wherein the cationic amphiphilic peptide comprises a β-hairpin conformation.

5. The composition of claim 2, wherein the amino acid sequence of the cationic amphiphilic peptide comprises the amino acid sequence VKVKVKVKV$^D$PPTKVEVKVKV (SEQ ID NO: 33), VLTKVKTKV$^D$PPTKVEVKVLV (SEQ ID NO: 30), or VKVKVKVKV$^D$PPTKVKVKVKV (SEQ ID NO: 31).

6. The composition of claim 2, wherein the cationic amphiphilic peptide is acetylated at the N-terminus.

7. The composition of claim 2, wherein the cationic amphiphilic peptide is amidated at the C-terminus.

8. The composition of claim 2, comprising from about 40 mM to about 250 mM tofacitinib.

9. The composition of claim 2, wherein the microcrystals of the immunosuppressive small molecule drug are from 1 μm to 100 μm in diameter.

10. The composition of claim 2, wherein the cationic amphiphilic peptide hydrogel comprises about 2% to about 30% DMSO.

11. A syringe comprising the composition of claim 2.

12. A method of inhibiting allograft rejection in a subject who has received an organ or tissue allograft, comprising administering the composition of claim 2 to the site of the allograft in the subject, wherein the organ comprises heart, lung, liver, kidney or intestine and the tissue comprises cornea.

13. A method of treating autoimmune injury of an organ in a subject suffering from an autoimmune disease, comprising administering an effective amount of the composition of claim 2 to the organ of the subject, wherein the autoimmune disease comprises type I diabetes, ulcerative colitis or Sjogren's syndrome.

14. The method of claim 13, wherein the autoimmune disease is ulcerative colitis.

15. The method of claim 12, further comprising administering cytotoxic T-lymphocyte-associated protein 4 (CTLA4)-Ig to the subject.

* * * * *